(12) United States Patent
Ebrahimi Afrouzi

(10) Patent No.: US 11,287,832 B2
(45) Date of Patent: Mar. 29, 2022

(54) POLYMORPHIC PATH PLANNING FOR ROBOTIC DEVICES

(71) Applicant: AI Incorporated, Toronto (CA)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 328 days.

(21) Appl. No.: 16/422,234

(22) Filed: May 24, 2019

(65) Prior Publication Data

US 2019/0278291 A1 Sep. 12, 2019

Related U.S. Application Data

(63) Continuation of application No. 16/041,286, filed on Jul. 20, 2018, now Pat. No. 10,353,399.

(60) Provisional application No. 62/535,555, filed on Jul. 21, 2017.

(51) Int. Cl.
*G05D 1/02* (2020.01)
*B25J 9/16* (2006.01)
*B25J 9/00* (2006.01)
*G01C 22/02* (2006.01)

(52) U.S. Cl.
CPC .......... *G05D 1/0272* (2013.01); *B25J 9/0003* (2013.01); *B25J 9/1664* (2013.01); *G01C 22/02* (2013.01); *G05D 1/0219* (2013.01); *G05D 2201/0203* (2013.01); *G05D 2201/0215* (2013.01)

(58) Field of Classification Search
CPC .............. G05D 1/0272; G05D 1/0219; G05D 2201/0215; B25J 9/0003; B25J 9/1664

USPC .......................................................... 701/25
See application file for complete search history.

(56) References Cited

U.S. PATENT DOCUMENTS

| | | | |
|---|---|---|---|
| 2005/0000543 A1* | 1/2005 | Taylor .................. | G05D 1/0219 134/18 |
| 2007/0234492 A1* | 10/2007 | Svendsen ................. | A47L 9/12 15/21.1 |
| 2007/0244610 A1* | 10/2007 | Ozick .................... | B25J 9/1694 701/23 |
| 2007/0285041 A1* | 12/2007 | Jones .................... | G05D 1/0227 318/568.12 |
| 2010/0037418 A1* | 2/2010 | Hussey ............... | B60L 15/2036 15/319 |
| 2011/0202175 A1* | 8/2011 | Romanov .................. | B25J 5/00 700/250 |
| 2013/0096717 A1* | 4/2013 | Yoon ..................... | A47L 9/0488 700/245 |
| 2016/0271795 A1* | 9/2016 | Vicenti .................... | B25J 9/163 |
| 2018/0004198 A1* | 1/2018 | Dabrowski .......... | G05D 1/0217 |
| 2018/0074508 A1* | 3/2018 | Kleiner ................ | G05D 1/0274 |
| 2018/0284786 A1* | 10/2018 | Moshkina-Martinson .................. A47L 9/2857 |
| 2018/0354132 A1* | 12/2018 | Noh ..................... | G05D 1/0274 |

\* cited by examiner

*Primary Examiner* — Krishnan Ramesh

(57) ABSTRACT

Provided is a robot-implemented, real-time, process to plan a coverage path, the process including: obtaining environment-sensor data indicating distances from the robot to surfaces in a portion of a working environment; obtaining odometry-sensor data; based on the environment-sensor data and the odometry-sensor data, determining at least a part of a coverage path of the robot through the working environment; and commanding an electric-motor driver to move the robot along the at least part of the path.

20 Claims, 17 Drawing Sheets

POLYMORPHIC PATH PLANNING FOR ROBOTIC DEVICES

CROSS-REFERENCE TO RELATED APPLICATIONS

This present application is a continuation of U.S. patent application Ser. No. 16/041,286, filed on 20 Jul. 2018, which claims the benefit of U.S. Provisional Patent Application 62/535,555, filed on 21 Jul. 2017. The entire content of each aforementioned patent filing is hereby incorporated by reference.

In this patent, certain U.S. patents, U.S. patent applications, or other materials (e.g., articles) have been incorporated by reference. Specifically, U.S. patent application Ser. Nos. 62/618,964, 62/573,591, 62/613,005, 62/583,070, 15/272,752, 62/661,802, and 62/666,266 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF INVENTION

The present disclosure relates to robotic devices, and more particularly, to path planning for robotic devices.

BACKGROUND

Autonomous and semi-autonomous robotic devices are increasingly used within consumer homes and commercial establishments. Such devices may include robotic cleaners, such as vacuum cleaners, lawn mowers, weed-removers, gutter cleaners, and mops. During operation, these robotic devices typically follow movement paths within the working environment while executing their task.

Embodiments of the present invention provide a path planning method for robotic devices responsive to stimulus from a configuration space.

SUMMARY

The following presents a simplified summary of some embodiments of the present inventions. This summary is not an extensive overview of the invention. It is not intended to identify key or critical elements or to delineate the scope of the inventions. Its sole purpose is to present some embodiments in a simplified form as a prelude to the more detailed description that is presented below.

Some aspects include a robot-implemented, real-time, process to plan a coverage path, the process including: obtaining, with one or more processors of a robot, environment-sensor data indicating distances from the robot to surfaces in a portion of a working environment of the robot from sensors carried by the robot; obtaining, with one or more processors of the robot, odometry-sensor data indicating changes in position of the robot over time; based on the environment-sensor data and the odometry-sensor data, determining, with one or more processors of the robot, at least a part of a coverage path of the robot through the working environment, wherein determining the at least part of the coverage path comprises determining lengths of segments of the coverage path, the segments having a linear or arc motion trajectory, and the segments forming a zig-zag pattern, a boustrophedon pattern, or a spiral pattern that covers at least part of the working environment; and commanding, with one or more processors of the robot, an electric-motor driver to move the robot along the at least part of the path.

The features and advantages described in the specification are not exclusive and, in particular, many additional features and advantages will be apparent to one of ordinary skill in the art in view of the drawings, specification, and claims. Moreover, it should be noted that the language used in the specification has been principally selected for readability and instructional purposes and should not be read as limiting.

BRIEF DESCRIPTION OF DRAWINGS

Non-limiting and non-exhaustive features of the present inventions are described with reference to the following figures, wherein like reference numerals refer to like parts throughout the various figures.

DETAILED DESCRIPTION OF CERTAIN EMBODIMENTS

Figure 1A:
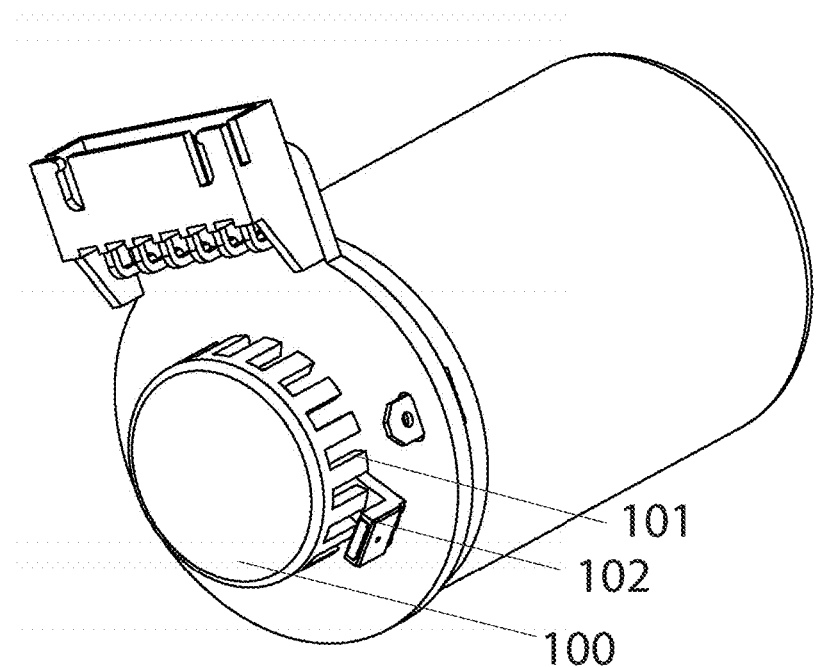
FIGS. 1A-1D illustrate an example of an encoder system implemented with a robotic device wheel, in accordance with some embodiments.

The present techniques will now be described in detail with reference to a few embodiments thereof as illustrated in the accompanying drawings. In the following description, numerous specific details are set forth in order to provide a thorough understanding. It will be apparent, however, to one skilled in the art, that the present techniques may be practiced without some or all of these specific details. In other instances, well known process steps and/or structures have not been described in detail in order to not unnecessarily obscure the present techniques.

Some embodiments include a robot configured to implement a path planning method that is responsive to stimulus from an observed environment using one or more processors of the robotic device. Some embodiments segment a working environment into regions and then dynamically adjust a coverage pattern within each of those regions abased on sensed attributes of the environment. In some embodiments, a topological graph represents the route plan of a robotic device and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robotic device as it follows along edges linked at vertices. While executing the movement path, in some embodiments, rewards may be assigned as the robotic device takes actions to transition between states and uses the net cumulative reward to evaluate a particular movement path comprised of actions and states. A state-action value function may be iteratively calculated during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by one or more processors of the robotic device iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment.

In embodiments, the properties of the vertices and edges of the topological graph describing the movement path of the robotic device may be provided at run-time as an argument based on sensory input of the robotic device. A property of a vertex may be, for example, its position and the number and position of vertices linked via edges. A property of an edge may be, for example, edge type such as a line or arc, edge length or radius depending on edge type, angular orientation and connecting vertices. In some embodiments, vertices and edges may also include other properties such as floor type, room identifier and/or possible operations (e.g., mopping, sweeping, UV, etc.). In embodiments, the topological graph may be implemented within a taxicab coordinate system, where the path is limited to following along the grid lines of the taxicab coordinate system, thereby limiting edge type to a line. In other embodiments, the number of roots or nodes of the topological graph is limited to one. One or more processors of the robotic device designate a vertex as a root within the topological graph that may be capable of reaching the whole graph from the designated vertex, i.e. there is a path from the root to all other vertices and edges within the graph.

In embodiments, one or more processors of the robotic device collect sensory input of the environment and create a map of the environment by stitching newly collected readings with previously collected readings. Techniques for creating a map from sensory input may be found in U.S. Patent App. No. 62/618,964, U.S. Patent App. No. 62/613,005, and U.S. Patent App. No. 62/573,591, the entirety of the contents of which are incorporated by reference above. As the one or more processors receive sensory input, in some embodiments, they create a representation of the map in a taxicab coordinate system and devise a topological path within discovered areas, i.e. areas for which sensory input has been collected, the edges of the path being lines following along the gridlines of the taxicab coordinate system. Sensory input may include, for example, a collection of depth measurements. In embodiments, depth measurements of the working environment (e.g., from the perspective of a robot) may be taken using depth measurement devices such as LIDAR, camera, laser, sonar, ultrasonic, stereo vision, structured light vision devices or chip-based depth sensors using CMOS or CCD imagers, IR sensors and such. In embodiments, other sensory input may be used, for example, data indicating flooring type or obstacle detection. For example, in embodiments, the one or more processors may receive input from optical floor sensors upon detection of a pattern of reflected light emitted onto the floor. The one or more processors may use one or more stages of signal processing and machine learning to determine to a degree of certainty the type of floor upon which the robotic device moves. As a further example, in embodiments, an obstacle sensor may detect obstacles or clutter on the floor based on reflection of emitted light. The obstacle sensor may then transmit that sensory input to the one or more processors of the robotic device for further processing. In embodiments, the one or more processors of the robotic device may receive input from tactile sensors when physical contact is made with an object.

The devised topological path may be based on estimates of suitable properties for vertices and edges based on sensory input received. The next action or movement of the robotic device may be along a path defined by the estimated properties of the vertices and edges. As the robotic device executes the action, it transitions from its current state to a new state. After completing each action and transitioning to a new state, in embodiments, a reward may be assigned and a state-action value function may be iteratively calculated based on the current reward and the maximum future reward at the next state. In some embodiments, e.g., where time is not considered discrete, the value of the reward may be dependent on sequential time required to complete the action and transition to the new state, where a greater negative reward is assigned for longer times. As such, in some embodiments, the robotic device incurs a negative reward at all times. Since the robotic device is penalized for time, any event that may reduce the efficiency of the robotic device in terms of cleaning time increases its overall penalty. These events may include collisions with obstacles, number of U-turns, repeat coverage, transitions between different types of flooring, and switching rooms. In embodiments, these events may be directly used to assign negative reward thereby acting as optimization factors themselves. In embodiments, other efficiency metrics may be used, such as coverage. Once the robotic device completes its task and hence the topological movement path required to complete the task, a positive reward value (e.g., predetermined or dynamically determined) may be assigned. A net reward value for the executed movement path, consisting of a sequence of states and actions, may then be calculated as the sum of the cumulative negative reward from the multiple actions taken while transitioning from one state to another and the positive reward upon completion of the task.

As multiple work sessions are executed over time, in embodiments, optimal state-action value function and optimal policy from which actions from different states are selected may be determined. From a single state, there may be several actions that can be executed. The sequence of states and actions that result in the maximum net reward, in some embodiments, provides the optimal state-action value function. The action from a state which results in the highest reward provides the optimal policy for the given state. As different movement paths are executed over time, the number of states experienced, actions taken from each state, and transitions increase.

In some embodiments, the processor(s) devises a path for the robotic device iteratively over multiple work sessions, evolving to become more efficient by choosing transitions that result in most favorable outcomes and by avoiding situations that previously resulted in low net reward. In embodiments, the processor(s) selects properties for each movement path within an assigned work cycle such that the cumulative penalty value for consecutive work cycles have a lowering trend over time. In some embodiments, the processor(s) of the robotic device may execute convergence to a particular movement path when the reward is maximized or a target reward is achieved or a period of time has passed after which the processor(s) may converge the movement path to the path with the highest reward. After convergence, assuming the system did not fall into a local minimum or is able to get out of a local minimum, the processor(s) may deem the evolved movement path to likely be more efficient than alternate paths that may possibly be devised using real-time sensory input of the working environment. In some embodiments, the processor(s) may avoid falling into a local minimum using techniques such as random restarts, simulated annealing and tabu search. For example, in employing random restarts technique, the processor(s) may randomly restart the process of searching for a candidate solution starting at a new random candidate after a certain amount of time, while still saving in memory previous candidate solutions. In embodiments wherein simulated annealing technique is used, the processor(s) replaces a current candidate solution when a better solution is found but may also probabilistically replace the current candidate solution with a worse solution. In embodiments using tabu search technique, the processor(s) may not return back to recently considered candidate solutions until they are sufficiently in the past. This is expected to provide a more reliable and efficient method for a robotic device to devise path plans as their movements are evaluated and optimized in real-time, such that the most efficient movements are eventually executed and factors reducing efficiency, including but not limited to, repeat coverage, collisions with obstacles, transitions between different types of flooring and U-turns, are reduced with the fine-tuning of properties over time.

Accordingly, some embodiments implement methods for optimizing path planning of a robotic device by responding to stimulus from an observed environment. Different movement paths may be experimented and evaluated within a particular working environment such that the most efficient movement path for the robotic device may evolve out of the process. In some embodiments, the working environment may be all areas of a space or may be an area within the space, such as a room. In some embodiments, a user, using a user graphical interface (see, e.g., U.S. application Ser. Nos. 15/272,752, 62/235,408, and 62/272,004, incorporated herein by reference) or a programming interface of the robotic device or other input device, or a processor(s) of the robotic device may assign a unique tag to different working environments. The unique tag may be used by the processor(s) to separate data relating to different environments. In embodiments wherein different working environments of the robotic device comprise connected rooms within a space, a room graph may be created by the processor wherein each working environment may be defined separately in order to avoid or minimize such issues. The room graph may be a mathematical graph that has nodes representing the rooms and vectors determining how the rooms are connected to one another. Each room may have its own properties associated with it such as a centroid, a set of perimeter points and doors corresponding to the working environment, doors labelled with the room to which they lead to, a unique number and/or label to identify the room and flags signifying visitations to the room. In embodiments, a topological graph may be used to describe the movement path of the robotic device. The topological graph consists of vertices and edges, the vertices being linked to one another by edges. Vertices are represented as distinct points while edges may be lines, arcs, or curves. The processor of the robotic device may employ topological geometry to spatially relate objects. In embodiments, the processor of the robotic device may use topological geometry to perform transformation of objections, such as, translation, rotation, reflection, stretching, bending and twisting, but neighborhoods, i.e. spatial relations, may remain preserved. For example, a circular curve centered within a larger circular curve contains a point P between the two circular curves and a point Q within the smaller circular curve. After transformation, the smaller circular curve has been stretched and bent to become a rectangular slit but remains within the larger circular curve. To preserve neighborhoods, the point P must remain between the two curves while the point Q must remain within the inner curve.

The topological graph described herein is similar to a Euclidean graph, such that the movement path described by the graph consists of a set of vertices and edges. However, in a Euclidean graph the edges are limited to being lines and the lines connecting vertices are equal to the Euclidean distance. This means the path between two vertices is always equal to the shortest path between them. In topological geometry, the edge may be a line, arc, or curve, hence the path between two vertices may not necessarily be the shortest path as in Euclidean geometry. Further, with topological graph, the elements of the graph, namely vertices and edges, may be deformed by means of variation in assigned properties. In embodiments, the properties of the vertices and edges of the topological graph describing the movement path of the robotic device are provided at run-time as an argument based on sensory input of the robotic device. This allows the processor of the robotic device to adapt its path to the observed environment. A property of a vertex may be, for example, its position, such as angular orientation, and the number and position of vertices linked via edges. A property of an edge may be, for example, edge type such as a line or arc, edge length or radius depending on edge type, angular orientation and connecting vertices. With topological geometry, any movement path may be devised with path elements, such as vertices, edges, and their associated properties. For example, a boustrophedon movement path, characterized by back and forth movement, may be considered equivalent to a set of vertices linked by edges, the vertices having properties defining position and angular orientation of linked vertices and the edges having properties defining edge type, such as a line, with given length, angular orientation and connecting vertices. As a further example, a spiraling movement path may be defined by a set of vertices linked by edges having edge type property of an arc, the radius of the arc increasing linearly at each step to achieve the spiraling movement.

In embodiments, the dimensionality of the topological graph describing the movement path is reduced by implementing it within a taxicab coordinate system. In taxicab geometry, all paths follow along gridlines of the coordinate system, thereby limiting edge type to a line. Further, the distance metric between vertices is the rectilinear distance or L1 norm, mathematically represented by:

$$d(p, q) = |p - q| = \sum_{i=1}^{n} |p_i - q_i|$$

where (p,q) are vectors p=($p_1$, $p_2$ . . . , $p_n$) and q=($q_1$, $q_2$ . . . , $q_n$). With taxicab geometry, the rectilinear distance between the two points is independent of the structure of the path following along the gridlines of the taxicab coordinate system. In some embodiments, the processor of the robotic device begins to collect sensory input of the environment and create a map by stitching newly collected readings with previously collected readings. In embodiments, sensory input is assumed to be independent and identically distributed (IID), where each observation has the same probability distribution as all other observations and all observations are mutually independent. If observations are defined to assume values in $\mathbb{I} \subseteq R$, then two random variables x and Y are identically distributed if and only if:

$$P[x \geq X] = P[x \geq Y], \forall x \in \mathbb{I}$$

and are independent if and only if:

$$P[y \geq Y] = P[y \geq Y | x \geq X] \wedge P[x \geq X] = P[x \geq X | y \geq Y], \forall x, y \in \mathbb{I}$$

In embodiments, the sensory input may go through various layers of mathematical processing, such as feature scaling, Bayesian probabilistic methods, and the like. Sensory input may include depth measurements or other measurements from which depth of objects may be inferred, such as time-of-flight or pixmap. Sensing devices include, but are not limited to, LIDAR, camera, laser, sonar, ultrasonic, stereo vision, structured light vision or chip-based depth sensors using CMOS or CCD imagers, IR sensors, and the like. Methods for creating a map from sensory input may be found in U.S. Patent App. No. 62/618,964, U.S. Patent App. No. 62/573,591, and U.S. Patent App. No. 62/613,005, the contents of which are incorporated by reference above. In some embodiments, as the processor(s) receives sensory input, it creates a representation of the map within a taxicab coordinate system and begins to devise a topological path within discovered areas, i.e. areas for which sensory input has been collected. For example, the processor(s) may mark as perimeter certain vertices of the taxicab coordinate system based on sensory input of the environment and the topological path may be restricted to remain within the marked perimeters. The topological path may be devised by estimating properties of the vertices and edges that define the path based on real-time sensory input. For implementation within a taxicab coordinate system, the edges of the path are lines following along gridlines of the coordinate system and are linked at vertices. As the robotic device begins to move by following along the devised topological path, the processor (used interchangeably with "processor(s)") of the robotic device continues to receive sensory input. The processor may use the sensory input to revise and expand the map as well as revise the properties of vertices and edges defining the topological path. As more data is collected a better perception of the environment is revealed and the map becomes more accurate and inclusive of the area. The topological path may consist of any number of vertices and edges, depending on the shape, size, etc., of the area discovered, and may be arranged in any number of ways. Because of the stochastic nature of the work place and partial observability, despite the efforts of processor to propose an optimal path, there may exist better paths which were not obvious to the robot at the time of decision making. However, over time the topological path is optimized by, for example, combining vertices by passing or eliminating an edge, removing or adding vertices, and/or edges and changing the direction or position of vertices and/or edges. In embodiments, an optimized path achieves better coverage of the discovered area. In embodiments, the robotic device may begin to start coverage of the working environment and performing work before exploration of the entire area is complete. In such cases, the processor is likely to choose movements that are locally optimal but not globally optimal.

The next action or movement of the robotic device is along the path defined by the estimated properties of the vertices and edges chosen based on real-time sensory input. As the robotic device executes the action, it transitions from its current state to a new state and movement from one state to the next is defined by a discrete time slot. This may be represented by a Markov Chain comprised of a sequence of random variables $s_1$, $s_2$, $s_3$, . . . . The random variables are states the robotic device may experience and form a set s called the state space. The topological graph defining the movement path of the robotic device may therefore be thought of as a sequence of states s∈S, where states are connected by paths and are each defined with a discrete time stamp t∈T. For the robotic device to transition from a current state s to next state s', the robotic device performs an action a∈A over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state is dependent only on the present state. This is mathematically represented by P(s'|s). A Markov chain may, therefore, be represented by a topological graph, where the edges of graph t are labelled by the probabilities of transitioning from one state at time t to another at time t'. A Markov chain may be further extended to a Markov Decision Process (MDP) through the addition of actions (choices) and rewards (motivation), such that there are multiple actions that may be chosen from a single state and a different reward associated with each action. MDP is a five-tuple comprising a finite set of states s, a finite set of actions A, the probability that action a will lead to state s' at time t' given by P(s'|s), the immediate reward after transitioning from state s to state s' given by r, and the discount factor γ, representing the difference in importance between future and present rewards. The goal of MDP is to find an optimal policy function π that specifies the highest rewarded action a to take for each state s. For a MDP, after completing each action and transitioning to a new state, a reward is assigned and a state-action value function is iteratively calculated as the expected value of the current reward plus the discounted maximum future reward at the next state. The state-action value function provides the value of a state. The processor of the robotic device does not require any visualization in choosing the next action of the robotic device, it only involves, in some embodiments, optimization of the state-action value function. In optimizing the state-action value function, the highest rewarded actions from each state are concurrently (e.g., simultaneously) identified and used in deriving the optimal policy. In embodiments, where the time is not considered discrete, the value of the reward may be dependent on sequential time required to complete the action and transition to a new state, where a greater negative reward is assigned for longer times. In such a case, the robotic device is always incurring negative reward and actions having smaller negative reward are considered superior. (Of course, the selection of sign is arbitrary, and embodiments may also implement the reverse arrangement, which is not to suggest that any other description is limiting.). Events that increase the time required to complete an action and transition to the next state may therefore indirectly increase the amount of negative reward incurred. Other optimization factors may also assign negative reward, including but not limited to, collisions with obstacles, number of U-turns, repeat coverage, transitions between different types of flooring or switching rooms. Once the robotic device completes its task, and hence the movement path required to complete the task, the processor may assign a predetermined positive reward. A net reward value for the executed movement path, consisting of a sequence of states and actions, in embodiments, may then be calculated as the sum of the cumulative negative reward from the multiple actions taken while transitioning from one state to another and the positive reward upon completion of the task.

Over time, the goal is to find optimal state-action value function and optimal policy from which actions from different states are selected. For a single state, there may be several actions that can be executed. The sequence of states and actions that result in the maximum net reward provide the optimal state-action value function for a given state. The action for a given state that results in maximum reward provides the optimal policy for the given state. An optimal policy for a state space may then contain the highest valued action corresponding to multiple states. As different movement paths are executed over time, the number of states experienced, actions taken from each state, and transitions increase. The path devised by the processor of the robotic device may iteratively evolve to become more efficient by choosing transitions that result in most favorable outcomes and by avoiding situations which previously resulted in low net reward. After convergence, assuming the system did not fall into a local minimum or is able to get out of a local minimum, the evolved movement path is trusted to be more efficient than alternate paths which may be devised using real-time sensory input of the working environment. In order to get out of local maximin, stochastic optimization is employed. This provides a reliable and efficient method for a robotic device to devise path plans as their movements are evaluated and optimized in real-time such that the most efficient movements are eventually executed and factors reducing efficiency, including but not limited to, repeat coverage, collisions with obstacles, transitions between different types of flooring, and U-turns, are reduced with the fine-tuning of properties over time.

The Markov Decision Process (MDP) consisting of a sequence of states and actions followed by rewards is mathematically notated below. Actions are taken to transition from one state to another and after transitioning to each new state a reward is assigned. For a sequence of states and actions, the net reward is the sum of rewards received for the sequence of states and actions, with future rewards discounted. The expected net reward for the execution of a sequence of states and actions is given by a state-action value function. The goal is to find an optimal state-action value function by identifying sequence of states and actions with highest net reward. Since multiple actions can be taken from each state, the goal is to also find an optimal policy that indicates the action from each state with the highest reward value. Consider a sequence of states s and actions a followed by rewards r:

$$s_t, a_t, r_{t+1}, s_{t+1}, a_{t+1}, r_{t+2}, s_{t+2}, a_{t+2}, r_{t+3}, \ldots a_T, t_T, s_T$$

The net return $R_T$ to be expected in the future is the sum of the rewards received for the sequence of states and actions beginning from state $s_t$ and ending with terminal state $s_T$. This is mathematically represented by:

$$R_T = r_{t+1} + \gamma^1 r_{t+2} + \ldots + \gamma^{T-t-1} r_T$$

where $0 \leq \gamma < 1$ is a discount factor applied as distant rewards are less important. The value of a state-action pair Q (s,a) is defined as equivalent to the expected return $R_T$ for the sequence of states and actions beginning with state $s_t$ and action $a_t$ and ending with terminal state $s_T$.

$$Q(s,a) = E[R_T | s_t = s, a_t = a]$$

By finding the sequence of states and actions which maximize the state-action value function Q (s,a), the optimal value function Q* (s,a) is identified:

$$Q^*(s,a) = \max E[R_T | s_t = s, a_t = a]$$

And the optimal policy for each state can be derived by identifying the highest valued action which can be taken from each state.

$$\pi^*(s) = \operatorname{argmax} Q^*(s,a)$$

To iteratively calculate the state-action value function for a given state s and action a, the Bellman Optimality equation may be applied. The optimal value function obeys Bellman Optimality equation and can be expressed as:

$$Q^*(s,a) = E[r + \gamma \max Q^*(s',a')]$$

The equation expresses that the value for a given state s and action a should represent the current reward r observed at state s plus the maximum discounted y future reward for the next state s' the robotic device would end up in. This equation can be used to iteratively calculate the state-action value for a given state s and action a as the sequence of states and action are executed. i is the iteration number and begins at i=0, with $Q_0(s',a')$ being initially assumed based, for example, on previous experience, the midpoint of the min and max value possible, or an arbitrary value.

$$Q_{i+1}(s,a) = E[r + \gamma \max Q_i(s',a')]$$

Based on the definition of an expected value, the equation is equivalent to:

$$Q_{i+1}(s,a)=\Sigma P(s'|s)[r+\gamma \max Q_i(s',a')]$$

where P(s'|s) is the probability that action a will lead to state s', as previously described above. In embodiments, the sequence of states and actions corresponds to the states visited and actions taken while executing the movement path from start to finish, where actions are defined by the properties of vertices and edges chosen based on sensory input of the robotic device. Over time, as more states are visited and different actions from each state are evaluated the system will converge to find the most optimal action to take from each state thereby forming an optimal policy. Further, as different sequences of states and actions, i.e. movement paths, are evaluated over time, the system will converge to the most optimal sequence of states and actions.

In some embodiments, the robotic device evaluates different movement paths while offline (e.g., between work sessions, such as between cleaning sessions, like while charging) using sensory input of the working environment previously collected and stored in memory of, or otherwise accessible to, the robotic device. Or in some cases, such processing may be offloaded to a remote application, e.g., a processor in a charging state or cloud-based infrastructure. In some embodiments, the robotic device experiments with (e.g., simulates and determines outcomes from) previously executed and new movement paths. Properties of vertices and edges are inferred from previously collected sensory input. In some embodiments, the robotic device is able to enhance and fine-tune movement paths while offline (or some embodiments may perform these actions online). The estimated time required to complete a task (e.g., cleaning a room with greater than threshold area coverage) is used to calculate a theoretical net reward value. The movement path with the greatest theoretical net reward value may be executed at the next cleaning cycle and based on measured performance (e.g., time to clean or coverage) the true net reward value may be determined. Some embodiments may determine a difference between estimated and measured performance and adjust model parameters to reduce the difference.

For the robotic device to physically take action and move, the processor may actuate the wheels, tracks, or other actuated interfaces with the environment. This may be accomplished, in some embodiments, through three subsystem layers of the processor, which in some cases, is onboard the robot. In embodiments, the first subsystem layer is the velocity controller, which receives requested linear and angular velocities and displacement from the polymorphic navigation algorithm (e.g., in the processor, implementing the techniques above) after the next action of the robotic device is chosen. The velocity controller may set the linear and angular velocity in m/s and rad/s, respectively. Formally, a linear velocity in the x-direction of a coordinate system is represented by $V_x$ while an angular velocity is represented by $V_w$. The velocity controller may also be used to monitor the set velocity to increase the likelihood that the target value is reached and maintained and to read and return the linear and angular velocities from a platform layer. This first subsystem layer, in some embodiments, also comprises an emergency stop function, such that the velocity is set to 0 m/s in the case of an emergency. Further, the ramp up/down time for a desired speed can be set within the velocity controller, thereby controlling acceleration and deceleration of the robotic device. The gradual acceleration and deceleration protects the motor and gears as a sudden increase in speed imposes a large torque on the wheel motors thereby causing wear to the motor and gears. For an emergency situation, ramp down is set to 0 m/s, causing the robotic device to immediately stop.

At the second layer, in some embodiments, a differential drive controller may be responsible for converting velocity set in the velocity controller into actual velocity. The linear and angular velocity set by the velocity controller must be translated into a velocity for each wheel. The differential drive controller sets the values on each of the individual motors and at this layer polarity indicates direction. The third layer is the embedded motor driver. Details of its functions are hidden from higher level subsystems, such as the velocity controller and differential drive controller. This driver controls the direction that the motor spins by setting a value of 0, 1, or −1, where for example, 0 indicates no rotation, 1 indicates clockwise rotation, and −1 counter-clockwise rotation. At an even lower level, the direction the motor spins can be controlled by applying a voltage of 0V, 5V or −5V to a general-purpose input/output (GPIO) pin on the integrated circuit (IC) or controller chip. The embedded motor driver also controls each motor individually by sending pulses of voltage to each motor. The number of voltage pulses per second controls the rotational speed of the motor while the value of voltage pulse controls the direction of rotation of the motor. Initially equal number of voltage pulses per second are sent to each of the motors of the robotic device. Since the motor is an analogue device and small variations exist in their wiring the number of rotations of each motor will not be exactly the same for every voltage pulse received. The gears and gear box also introduce some noise as they are slightly different from one another. Further, slippage adds to the unpredictability of the speed and/or displacement of each wheel. Therefore, the number of voltage pulses per second needs to adjusted based on such noise in order to achieve the target rotational speed and displacement over a period of time.

In some embodiments, the processor in each of the three layers described above has three modes: regular operational mode, in which the controller will accept velocity commands and check for safety events; safety mode, in which a safety event has occurred and the robotic device remains stopped until the event is acknowledged by the application layer; and recovery mode, in which a safety event is acknowledged by the application layer and corrective action is taken or the safety event is ignored. The three modes may have a mutex lock in relation to one another such that the robotic device cannot move if any of the processors of the three layers are in safety or recovery mode.

Figure 1B:
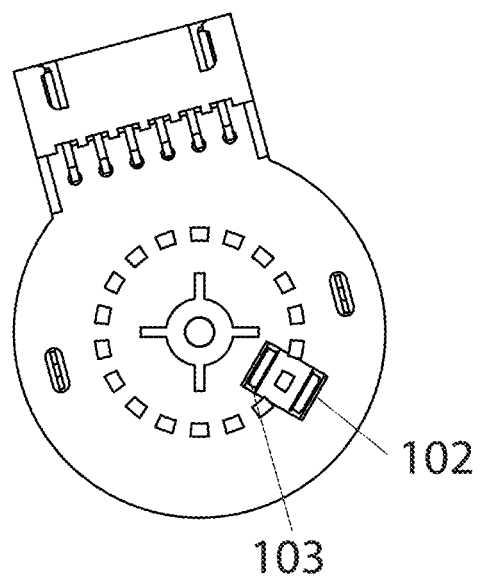
Figure 1C:
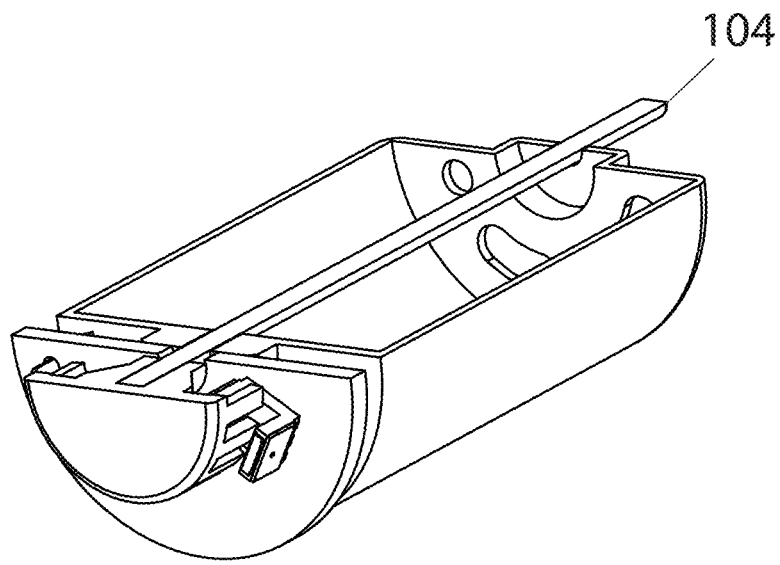
Figure 1D:
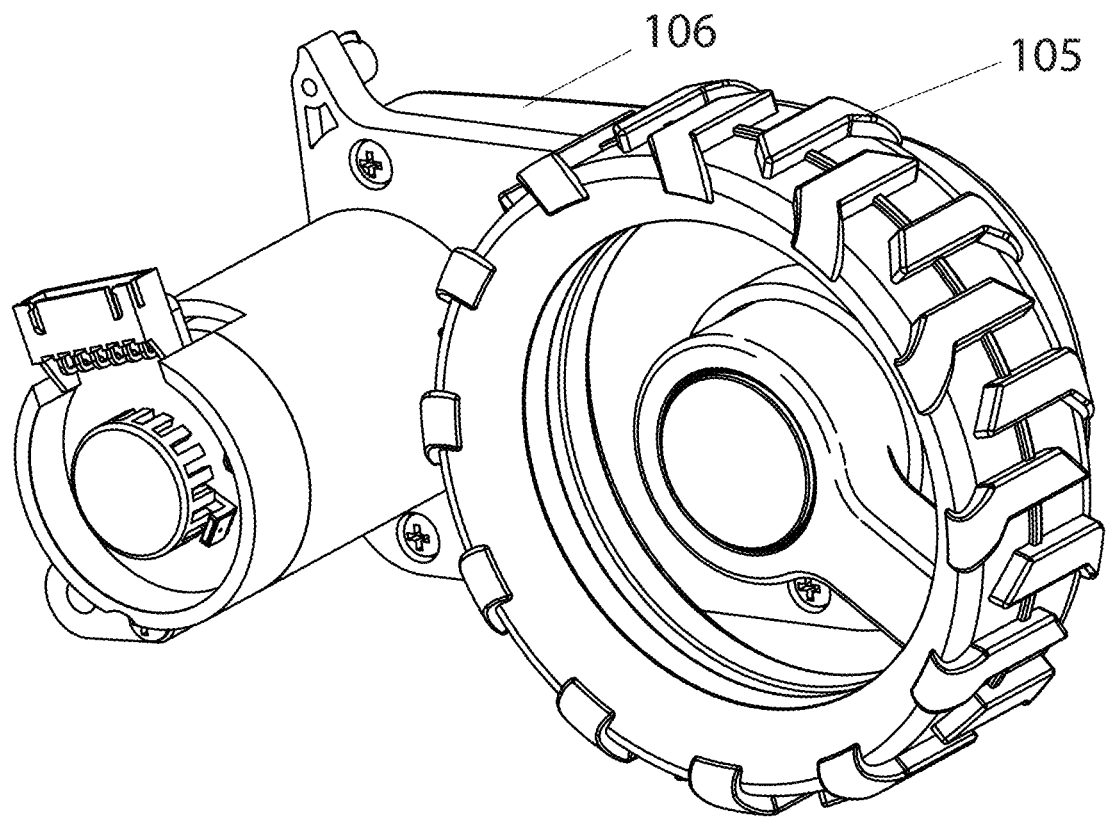

The distance travelled can be measured with a variety of techniques, e.g., by visual odometry or by an encoder. As shown in FIGS. 1A and 1B, an encoder wheel 100 has square slots 101 that, when aligned with LED transmitter 102 and LED receiver 103, allow IR light transmitted by LED transmitter 102 to be received by LED receiver 103. LED transmitter 102 and receiver 103 are stationary, while encoder wheel 100 rotates when power is provided to motor 104 shown in FIG. 1C. In FIG. 1D motor 104 interfaces with wheel 105 of the robotic device through gears contained within enclosure 106, such that rotation of the motor causes rotation of encoder wheel 100 and wheel 105 of the robotic device. As encoder wheel 100 rotates, IR light transmitted by LED transmitter 102 is able to be received by LED receiver 103 each time square slot 101 is in line with IR transmitter 102 and receiver 103. The number of times IR light is received by receiver 103 is counted, where each time receiver 103 receives IR light is referred to as a tick. In embodiments, the number of times the IR light is blocked may alternatively be counted. The number of slots 101 on encoder wheel 100 define the resolution of the encoder, a constant referred to as encoder resolution. The encoder resolution can be used to specify the amount of encoder wheel rotation given the number of times IR light is received. The amount of rotation of encoder wheel 100200 is correlated with the amount of displacement of wheel 104 of the robotic device on the working surface. Therefore, given the number of slots 101 on encoder wheel 100, the number of ticks counted, and the ratio of size between encoder wheel 100 and wheel 104 of the robotic device, the distance travelled can be determined. Further, given the time, the speed may also be determined. A tick resolution may be defined as the amount of distance travelled between two counted ticks or two instances of receiving light by the IR receiver. In order to calculate the total distance travelled the total number of ticks can be multiplied by the tick resolution. In addition to the encoder system, a gyroscope, such as L3GD20 gyroscope by STMicroelectronics, may also be used. The gyroscope may use an I²C (inter-integrated-circuit) interface with two pins or an SPI (serial peripheral interface) with four pins to communicate with the processor.

Due to imperfection in analog motors, gears, tiny spikes in voltage, measurement errors and such, a difference between the desired traveled distance and the actual traveled distance is expected. When the module implementing the polymorphic algorithm above determines the next action, in some embodiments, the corresponding linear and angular velocities and displacement requested to achieve said action is passed from the velocity controller, to the differential driver controller, then to the embedded motor driver to actuate movement of the wheels and complete the action. The traveled distance measured by the encoder may not necessarily be the same as the desired target displacement. In some embodiments, an adaptive processor is used to record the difference between the target value and actual value of the displacement over one time step. This is considered the absolute error and is given by:

error=|target value−actual value|

As the robotic device moves, the absolute error sum may also be calculated by summating the absolute error for each time step:

$$\text{error sum} = \sum_{t=1}^{\infty} error_t$$

In some embodiments, the processor of the robotic devices uses a control loop feedback mechanism is used to minimize the difference between the target value and actual value by correcting the future number of voltage pulses provided to each motor based on previous results, wherein the number of voltage pulses per second controls the rotational speed of the motor and hence measured displacement over one time step. In embodiments, the future number of voltage pulses provided is corrected by using a proportional adjustment. For example, if a wheel is receiving 100 pulses per second and previously measured displacement is ten percent more than the target displacement desired, a proportional adjustment P is applied to the future number of voltage pulses such that 90 pulses per second are provided in order to attempt to achieve the target displacement. This can be mathematically represented by:

$P=K_p*\text{error}$ where $K_p$ is the proportional gain constant. This helps smoothen the trajectory of the robotic device, however since the adjustment is applied at a time when the wheel is already faster than desired, the initial velocity of the wheel prior to the adjustment still has an impact on the trajectory which is affected by the original overshoot. An integral I of past errors over time may be applied as a further correction to eliminate residual error. This is mathematically represented by:

$I=K_i\int_0^t \text{error } dt$ where $K_i$ is the integral gain constant. The integral can be calculated by summating the absolute error for each time step over a period of time. The integral correction helps reduce systematic errors, such as errors created due to, for example, a wheel being slightly larger or a motor being slightly more powerful or a motor receiving slightly higher voltage than expected. The integral may have a limit, where only a limited portion of the history is considered. A derivative D may also be calculated and used in applying a correction to the variable controlling the target value in order to reduce the error and is given by:

$$D = K_d \frac{\Delta \text{error}}{\Delta \text{time}}$$

where $K_d$ is the derivative gain constant. The derivative is the best estimate of the future trend of the error based on its current rate of change. The three constants $K_p$, $K_i$, and $K_d$ may be tuned to the specific application such that the difference between the target value and actual value is minimized. The proportional, integral and derivative corrections may be combined to produce an output that may be applied as a correction to the variable controlling the desired outcome in order to reduce the overall error.

output=P+I+D

In this case, for example, the correction may be applied to the number of voltage pulses per second provided to the motor in order to achieve the desired displacement and thereby reduce the error between target and actual displacement. At startup, the accumulated error is reduced by the gradual acceleration of the robotic device. This allows the displacement and corresponding adjustment of the motor speed to be applied before the robotic device reaches maximum speed resulting in smaller displacements while only limited feedback is available.

The implementation of a feedback processor is beneficial in some cases as a differential drive mechanism, comprised of two independently driven drive wheels mounted on a common axis, used by robotic devices may be highly sensitive to slight changes in velocity in each of the wheels. The small errors in relative velocities between the wheels can affect the trajectory of the robotic device. For rolling motion the robotic device rotates about an instantaneous center of curvature (ICC) located along the common axis. To control the trajectory of the robotic device the velocities of the two wheels can be varied. The angular velocity ω about the ICC can be related to the velocities $v_l$ and $v_r$ of the left and right wheels, respectively, by:

$$\omega\left(R + \frac{l}{2}\right) = v_r$$

-continued $$\omega\left(R - \frac{l}{2}\right) = v_l$$

where l is the length of the axle connecting the two wheels and R is the distance from the ICC to the midpoint of the axle connecting the two wheels. If $v_l=v_r$, then there is only forward linear motion in a straight line. If $v_l=-v_r$, then the ICC is at the midpoint of the axle and there is only rotation in place. If $$v_l = 0 \frac{m}{s},$$

then the ICC is at the left wheel, i.e. rotation is about the left wheel. The same applies for the right wheel if $$v_r = 0 \frac{m}{s}.$$

To navigate the robotic device, assume the robotic device centered at the midpoint between the two wheels and is at a position (x,y), headed in a direction θ with respect to the horizontal x-axis. By adjusting $v_l$ and $v_r$ the robotic device may move to different positions and orientations. The position of the ICC can be found by:

ICC=[$ICC_x$,$ICC_y$]=[x−R sin θ,y+R cos θ]

At time t+δt the pose of the robotic device (x',y',θ') is:

$$\begin{bmatrix} x' \\ y' \\ \theta' \end{bmatrix} = \begin{bmatrix} \cos(\omega\delta t) & -\sin(\omega\delta t) & 0 \\ \sin(\omega\delta t) & \cos(\omega\delta t) & 0 \\ 0 & 0 & 1 \end{bmatrix} \begin{bmatrix} x - ICC_x \\ y - ICC_y \\ \theta \end{bmatrix} + \begin{bmatrix} ICC_x \\ ICC_y \\ \omega\delta t \end{bmatrix}$$

For a differential drive the navigation strategy of the robotic device is to move in a straight line, rotate in place, then move in a straight line again in order to reach desired (x,y,θ). For motion in a straight line where $v_l=v_r=v$, the equation used to determine the pose of the robotic device reduces to:

$$\begin{bmatrix} x' \\ y' \\ \theta' \end{bmatrix} = \begin{bmatrix} x + v\cos\theta\delta t \\ y + v\sin\theta\delta t \\ \theta \end{bmatrix}$$

And for rotation in place where $v_l=-v_r$, the equation used to determine the pose of the robotic device reduces to:

$$\begin{bmatrix} x' \\ y' \\ \theta' \end{bmatrix} = \begin{bmatrix} x \\ y \\ \theta + \frac{2v\delta t}{l} \end{bmatrix}$$

In some embodiments, an H bridge IC or driver, such as Quadruple Half-H bridge driver SN754410 by Texas Instruments or other similar bridge drivers, may be used to control DC motors. The H bridge is used to drive the motor's direction and regulate its speed. For example, Quadruple Half-H bridge driver SN754410 has 16 pins and is able to enable a pair of DC motors on each side of the IC using pins 1 and 9. These pins will run the motors by enabling them with a voltage generated by a battery connected to pin 16. The left motor leads connect to output pins 3 and 6 and right motor leads to output pins 11 and 14. Input pins 2, 7, 10, and 15 may be connected to a Beaglebone Black Board (BBB) from which input commands are sent. A BBB is a low-power open-source single-board computer. Pins 4, 5, 12 and 13 are connected to ground.

Figure 2A:
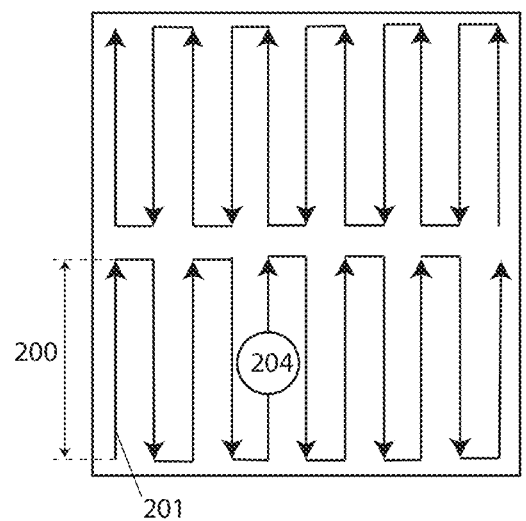
FIG. 2A and FIG. 2C illustrate a top view of boustrophedon route plan with preprogrammed properties for elements forming the route plan for working environments of the same shape but different size, in accordance with some embodiments.
Figure 2B:
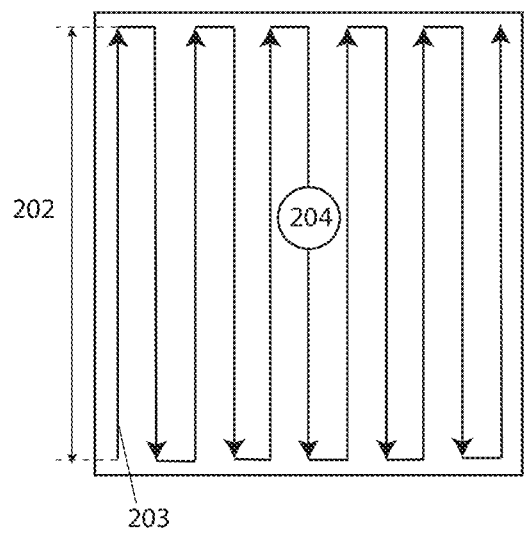
FIG. 2B and FIG. 2D illustrate a top view of a route plan with properties for elements forming the route plan determined at run time for working environments of the same shape but different size, in accordance with some embodiments.

FIG. 2A illustrates a preprogrammed boustrophedon route plan with predetermined properties of vertices and edges defining the route plan. The route is shown (here and in other similar figures) in a plan view of a working environment. For example, length 200, a property of edge 201, is predetermined. FIG. 2B illustrates an example of a boustrophedon route plan with length 202, a property of edge 203, is determined at run time in response to the observed environment. Edges may also be referred to as segments of a path between decision points. FIG. 2B illustrates the advantages of a polymorphic navigational approach, wherein properties of vertices and edges forming a route plan are determined at run time, instead of a route plan with preprogrammed properties as in FIG. 2A. Some embodiments may implement a hybrid approach in which portions of a route are pre-programed and others are determined at run time (e.g., while performing a task in a working environment by a robot). It can be seen, that even for a basic rectangular working environment, the boustrophedon route plan with preprogrammed length 200 in FIG. 2A does not provide the most efficient movement path for the robotic device. In comparison, boustrophedon route plan in FIG. 2B with edge length 202 determined at run time has half as many U-turns thereby decreasing the total working time of the robotic device and improving its efficiency. In the polymorphic approach, the robotic device is able to decide the properties of vertices and edges at run time based on the real-time input of the working environment (e.g., by sensing dimensions of a room). In this case, length 202 of edge 203 in FIG. 2B is chosen to be the length of the working environment, thereby resulting in less U-turns and allowing for a more efficient route plan for the robotic device. Further, the number of vertices and edges are determined at run-time based on the real-time input of the working environment making it more likely that the entire working environment is covered.

Figure 2C:
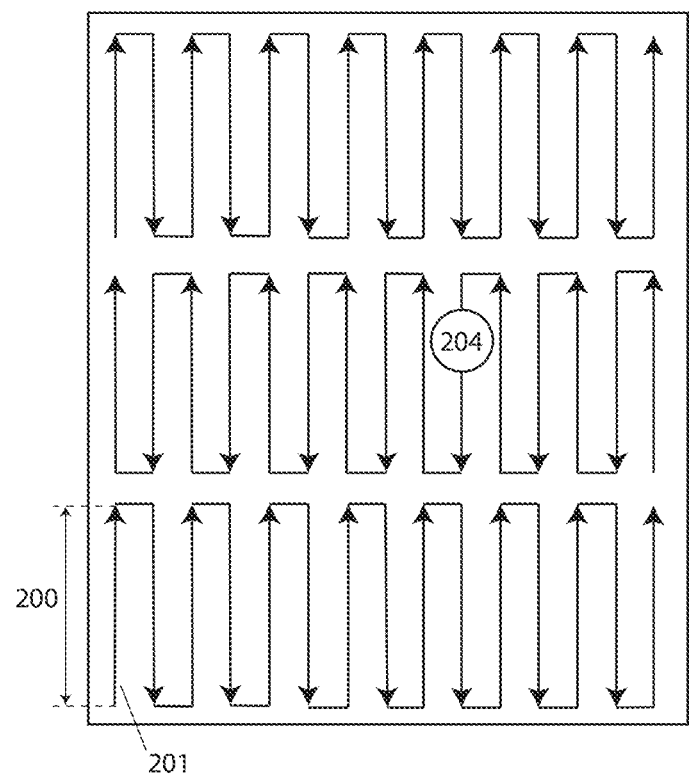
Figure 2D:
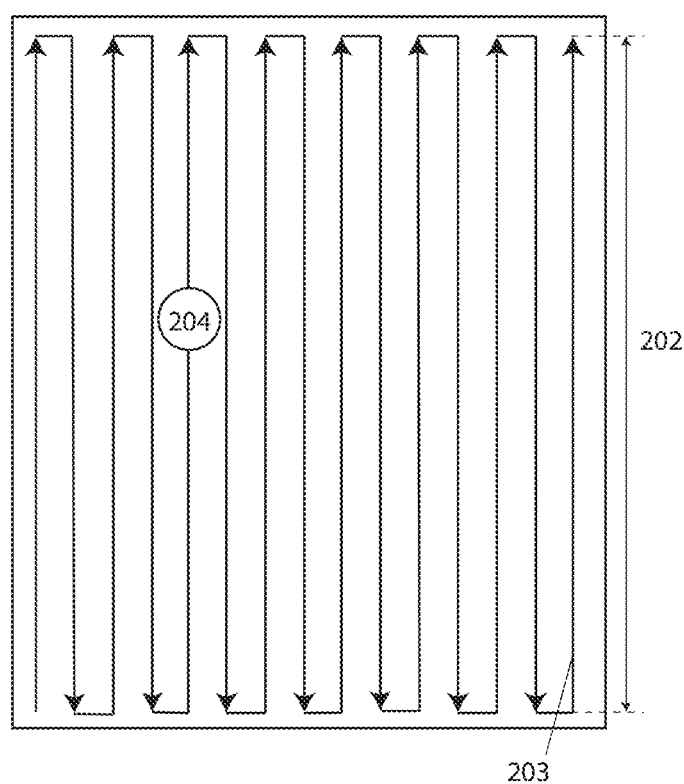

FIG. 2C illustrates a boustrophedon route plan with preprogrammed length 200, a property of edge 201, while FIG. 2D illustrates an embodiment of a boustrophedon route plan with length 202, a property of edge 203, determined at run time. The working environment illustrated in FIGS. 2C and 2D are of the same shape as the working environments in FIGS. 2A and 2B, but of different size. Assuming the same robotic device is used in FIGS. 2A and 2C, the boustrophedon route plan in FIG. 2C has same preprogrammed length 200 as in FIG. 2A, despite the increase in size in the working environment. Regardless of the size and shape of the working environment, the properties of vertices and edges forming the boustrophedon route remain the same as they are predetermined and preprogrammed into the processor(s) of the robotic device. However, with the polymorphic navigation approach, properties of vertices and edges are determined at run time and are based on the real-time input of the working environment. In this case, with a larger working environment, length 202 of the boustrophedon route plan in FIG. 2D is greater as it is chosen to be the length of the working environment, allowing for significantly less U-turns thereby improving the efficiency of the robotic device. The number of back and forth movements is also increased in this larger working environment through the addition of added vertices and edges such that the entire working area may be covered. In this way, the number and properties of vertices and edges may be chosen such that the route plan is adapted to the real-time working environment, wherein different number and properties of vertices and edges forming a route plan are chosen for working environments in FIGS. 2B and 2D by the same robotic device.

Figure 3A:
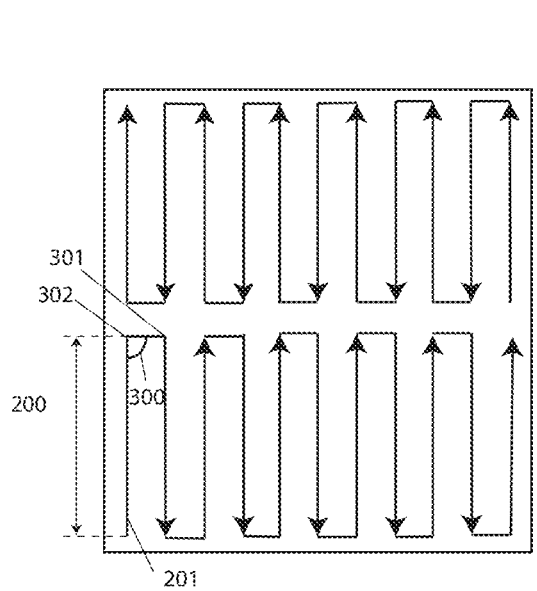
FIG. 3A and FIG. 3C illustrate a top view of boustrophedon route plan with preprogrammed properties for elements forming the route plan for working environments of similar size but different shape, in accordance with some embodiments.
Figure 3B:
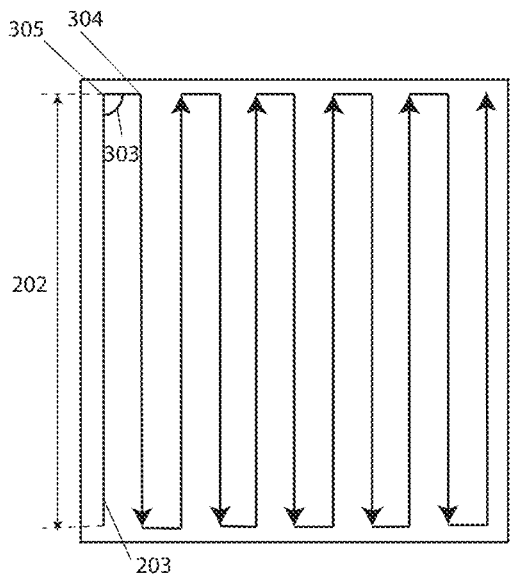
FIG. 3B and FIG. 3D illustrates a top view of a route plan with properties for elements forming the route plan determined at run time for working environments of similar size but different shape, in accordance with some embodiments.

FIG. 3A illustrates a boustrophedon route plan with preprogrammed length 200 of edge 201, and preprogrammed angular orientation 300 of vertex 301 relative to vertex 302. FIG. 3B illustrates an embodiment of a boustrophedon route plan with length 202 of edge 203 and angular orientation 303 of vertex 304 relative to vertex 305 determined at run time. A more efficient route plan is devised and executed in FIG. 3B as a polymorphic navigational approach is used wherein properties of vertices and edges forming the boustrophedon route plan are determined at run time based on the real-time input of the working environment. Edge 203 spans the length of the room, thereby reducing the number of U-turns and improving the efficiency of the robotic device in covering the working area. In FIG. 3A, boustrophedon route plan with preprogrammed properties 200 and 300 results in increased U-turns as parameters are predetermined, remaining the same for any working environment.

Figure 3C:
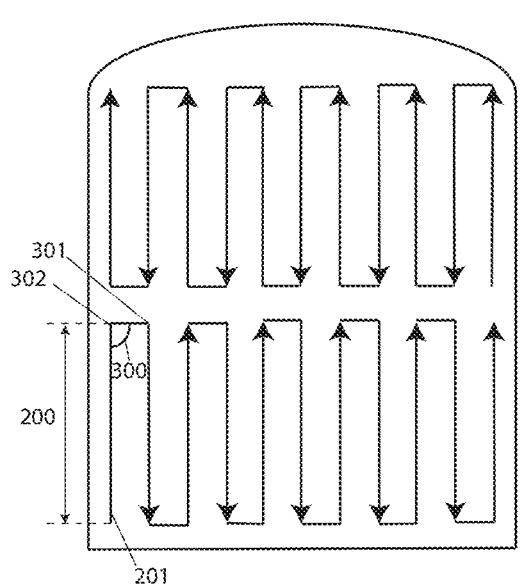
Figure 3D:
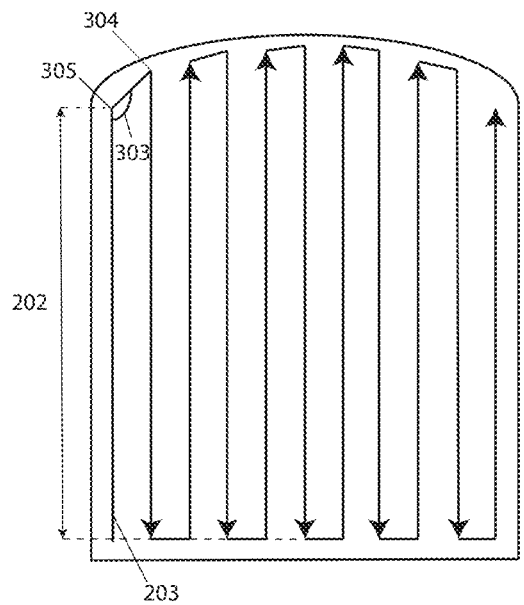

As shown in FIGS. 3C and 3D, the working environment illustrated is of similar size as the working environment in FIGS. 3A and 3B, but of different shape. Assuming the same robotic device is used in FIGS. 3A and 3C, the boustrophedon route in FIG. 3C has the same preprogrammed properties 200 and 300 as in FIG. 3A, despite the change in shape of the working environment. Regardless of the size and shape of the working environment, the properties of vertices and edges associated with the boustrophedon route plan remain the same as they are predetermined and preprogrammed into the processor of the robotic device. However, with the polymorphic navigational approach, properties of vertices and edges connected in forming the boustrophedon route plan are adapted to the working environment. In this case, length 200 of edge 201 and angular orientation 300 of vertex 301 relative to vertex 302 in FIG. 3D are chosen based on the observed working environment to devise a more efficient route plan for the robotic device. In comparison to FIG. 3C where properties of vertices and edges are preprogrammed, the polymorphic approach allows for significantly less U-turns thereby improving the efficiency of the robotic device and increased coverage of the working area. In this way, properties are chosen such that the boustrophedon route plan is adapted to the real-time working environment, wherein different properties of vertices and edges are chosen for working environments in FIGS. 3B and 3D by the same robotic device.

Figure 4A:
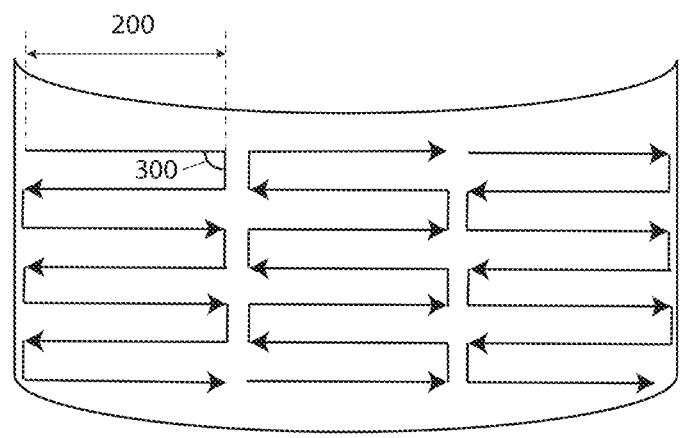
FIG. 4A, FIG. 4C, and FIG. 4E illustrate a top view of boustrophedon route plan with preprogrammed properties for elements forming the route plan for working environments of different shapes and sizes, in accordance with some embodiments.
Figure 4B:
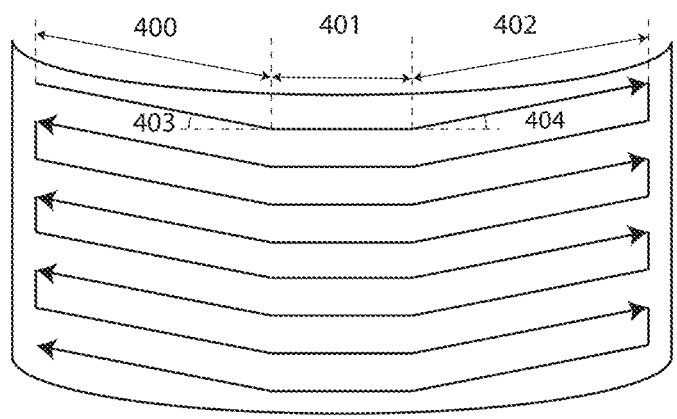
FIG. 4B, FIG. 4D, and FIG. 4F illustrate a top view of a route plan with properties for elements forming the route plan determined at run time for working environments of different shapes and sizes, in accordance with some embodiments.
Figure 4C:
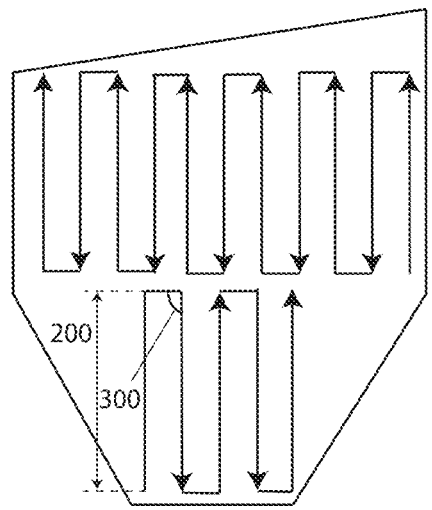
Figure 4D:
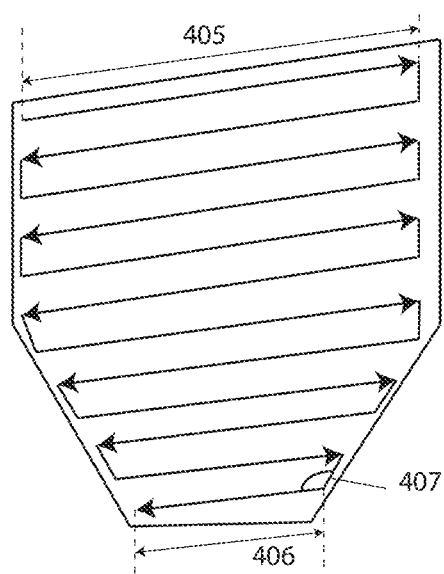
Figure 4E:
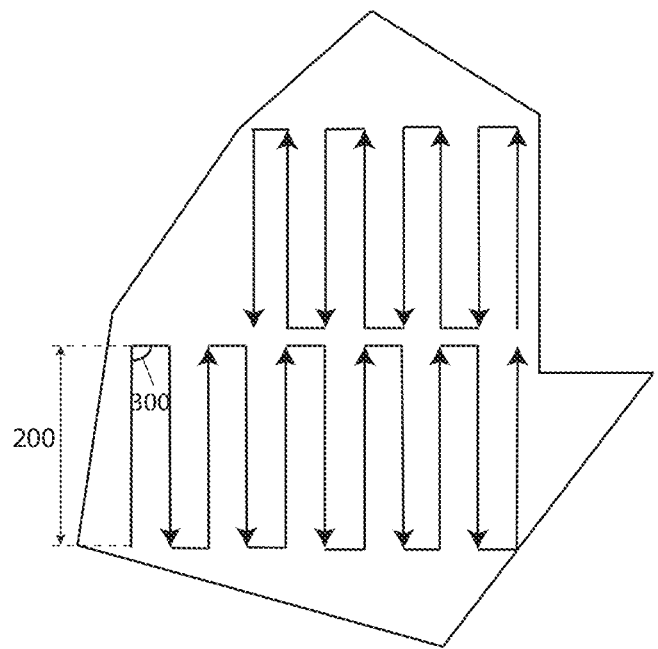
Figure 4F:
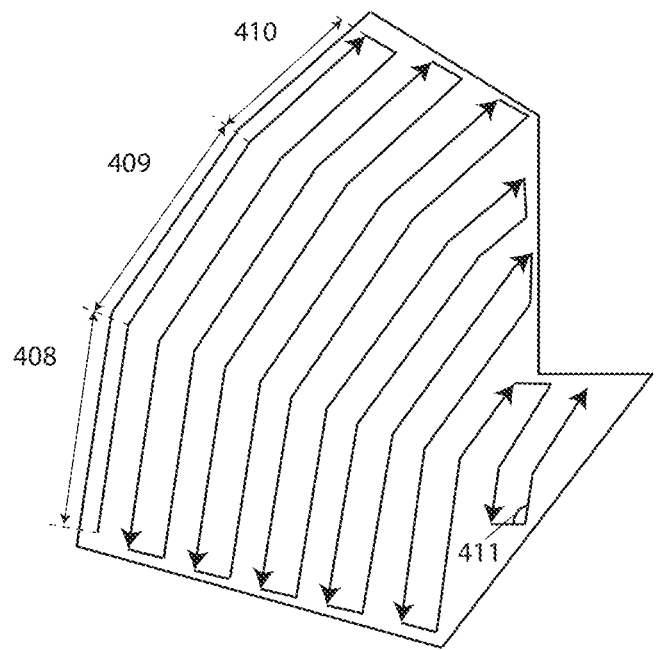

FIG. 4A-F illustrate boustrophedon route plan with preprogrammed properties for vertices and edges (A, C, E) and an embodiment of boustrophedon route plan with properties determined at run time (B, D, F) for working environments of different sizes and shapes. Referring to FIG. 4A, boustrophedon route plan with same preprogrammed properties 200 and 300 as previously described, are used in navigating the working environment. An unnecessary number of U-turns are used and areas remain uncovered by the robotic device as properties of vertices and edges forming the path are predetermined independently of the shape and size of the working environment. Referring to FIG. 4B wherein properties of vertices and edges are dependent on the real-time working environment and are determined at run time, the route plan, with route parameters such as edge lengths 400, 401, 402 and angular orientation between vertices 403 and 404, improves efficiency of the robotic device and coverage of the area. Referring to FIGS. 4C and 4E, boustrophedon route plan with preprogrammed properties 200 and 300 remains the same despite the change in size and shape of the working environment, assuming the same robotic device is used as in FIG. 4A. Referring to FIGS. 4D and 4F in comparison, assuming the same robotic device is used as in FIG. 4B, properties of vertices and edges such as edge lengths 405, 406 or 408, 409, 410 and angular orientation between vertices 407 or 411 in addition to the number of vertices and edges are chosen such that the route plan is adapted to the working environment when a polymorphic navigational approach is used. This allows for the robotic device to devise a route plan that may improve its working efficiency by, for example, reducing the number of U-turns and increasing the total area covered.

In embodiments, the route plan is devised within an area smaller than the total area perceived. A margin with respect to the perimeter of the working environment is set and the route plan is devised within the area bounded by the set margins. In embodiments, the margins are set by the processor of the robotic device based on observed input of the environment while in another embodiment the size of margins are predetermined. In another embodiment, the margins are set by the user through a graphical user interface (GUI), such as those noted above. Margins minimize disruption during execution of route plans that may arise due to inaccuracies in measurements or measurements collected by low resolution devices where the perceived perimeter may not be exact. If the route plan happens to intersect with the true perimeter, the route plan is disrupted. Margins also help accommodate irregularities in the shape of the environment, where, for example, it would be hard to accommodate a boustrophedon pattern if there is small alcove located along one of the walls of the room. In such a case where margins are used, the small alcove would be left out of the covered area. In embodiments, after the route plan devised within the area bordered by the margins is complete, the robotic device covers the areas between the perimeter and margins thereby coverings areas previously left out. This ensures the robotic device cleans in a methodical way while covering all areas. Without margins, it is difficult to find a non-repeating and optimal route plan, while with margins a repeating route plan may be executed within the margins followed by coverage along the perimeter.

In some embodiments, a graphical user interface (GUI), such as one presented on a smartphone, computer, tablet, dedicated remote control, or any device that may display output data from the robotic device and receive inputs from a user may be used (see, e.g., U.S. application Ser. Nos. 15/272,752, and 62/661,802, incorporated herein by reference) to allow the user may choose to only clean areas within the borders of the margin and skip coverage along the perimeter. A user may such GUI to choose this if the perimeters are difficult to cover, for example, if there is minimal space between a piece of furniture and the perimeter. In some embodiments, the user may choose to cover only certain areas along the perimeter, thereby avoiding difficult areas to cover. In some embodiments, the user may choose to cover areas bordered by the margins in one work session and complete coverage along the perimeter in a separate work session. Various alternating combinations are possible. For example, the user may only choose along the perimeter if it requires more cleaning than central areas within the margins and vice versa.

In embodiments, the map of the area, including but not limited to (which is not to imply other descriptions are limiting) perimeters, doorways, sub areas, perimeter openings, and information such as coverage pattern, room tags, order of rooms, etc. may be available to the user through the GUI (see, e.g., U.S. patent application Ser. No. 15/272,752, incorporated herein by reference). Through the GUI, a user may review, accept, decline, or make changes to, for example, the environmental representation and settings and operations of the robotic device within the environment, which may include, but are not limited to, route plan, type of coverage algorithm of the entire area or each subarea, correcting or adjusting map boundaries, order of cleaning subareas, scheduled cleaning of the entire area or each subarea, and activating or deactivating tools such as UV light, suction and mopping. User inputs are sent from the GUI to the robotic device for implementation. Data may be sent between the robotic device and the user interface through one or more network communication connections. A variety of types of wireless network signals may be used, including, but not limited to, radio signals, Wi-Fi™ signals, or Bluetooth™ signals.

In some embodiments, a route plan is devised within discovered areas of the environment where it is not required that the entire working environment be mapped before devising a route plan. In some embodiments, observations of the environment continue while the robot executes a route plan within discovered areas, resulting in newly discovered areas and a more defined perceived environment. In embodiments, the robotic device executes a route plan based on the perceived environment and discovery of new areas alternate. For example, the robotic device may first be in discovery mode where observations of the environment are collected thereby discovering new areas. Following discovery mode, the robotic device may then execute a route plan devised within the discovered areas based on the discovered areas perceived. In embodiments, the robotic device concurrently (e.g., simultaneously) devises and executes a route plan based on the perceived environment and discovers new areas. For example, the processor of the robotic device may perceive an area surrounding its starting point and devise a route plan within the perceived area. While it executes the route plan, new areas are perceived for which a second route plan is devised. In embodiments, the route plan may be altered or amended as new areas are discovered and perceived. In other embodiments, a route plan is completed without alteration and a second route plan is devised within newly discovered areas.

In embodiments, after executing a first route plan within a first discovered area, the robotic device moves to a central or preferred location within the second discovered area before beginning to devise and execute a new route plan within the second discovered area. In embodiments, the robotic device devises the second route plan within the second discovered area such that the ending point of the first route plan is close to or is the same as the starting point of the second route plan. In environments where this is difficult to achieve, the robotic device moves to a central or other preferred location within the second discovered area and starts the second route plan from there.

Figure 5:
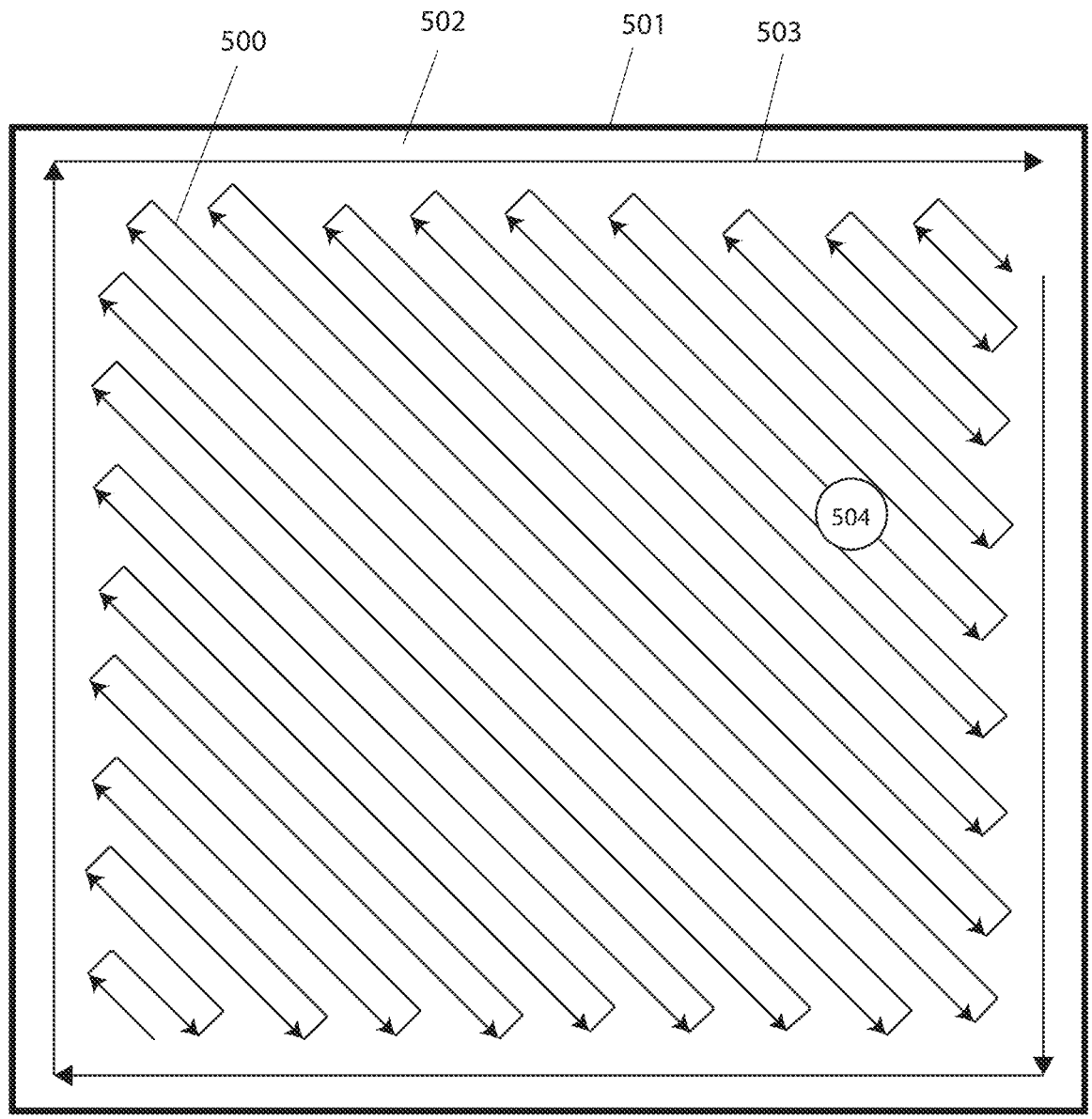
FIG. 5 illustrates a top view of a route plan skewed with respect to the perimeters of an environment, in accordance with some embodiments.

In embodiments, the route plan devised may not be aligned with the perimeters of the environment. The route plan devised using the polymorphic navigational approach may be skewed with respect to the perimeters of the environment. For example, in FIG. 5 segments of route plan 500 are skewed with respect to perimeter 501 of environment 502.

In some embodiments, the route plan devised and executed by the robotic device may comprise coverage of central areas within the environment first, followed by coverage around the perimeters of the environment. For example, in FIG. 5 route plan 500 may first be executed within central areas of environment 502 followed by route plan 503 along perimeter 501 of environment 502. In other embodiments, route plan 503 along perimeter 501 of environment 502 may be executed first before executing route plan 500 covering central areas of environment 502. In some embodiments, only central areas of the environment may be covered or perimeters of the environment may be covered.

In some use cases, e.g., where the environment comprises multiple rooms, a route plan covering the central areas followed by the perimeters of each room in sequence may be executed. For example, for an environment comprised of three rooms a route plan covering the central area then the perimeter of the first room, followed by the central area then the perimeter of the second room and finally the central area then the perimeter of the third room may be executed. In some embodiments, central coverage of all rooms may be executed first, then coverage of the perimeters of all rooms and vice versa. For example, a route plan covering, in the following order, the central area of the first room, the central area of the second room, the central area of the third room, the perimeter of the third room, the perimeter of the second room and the perimeter of the first room may be executed. Or, for example, a route plan covering, in the following order, the perimeter of the third room, the perimeter of the second room, the perimeter of the first room, the central area of the first room, the central area of the second room and the central area of the third room may be executed. The sequence of coverage of the central areas and perimeters of the rooms may be dependent on the layout of the rooms within the environment. The most efficient sequence of coverage of the central areas and perimeters of the rooms may be determined over time using, for example, an MDP technique.

Figure 6A:
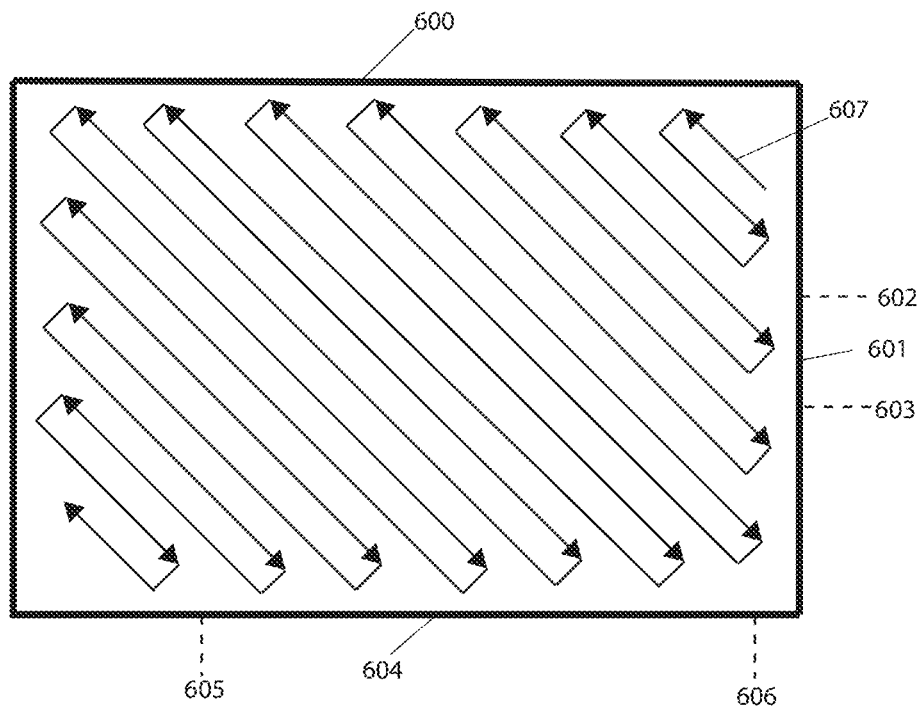
FIG. 6A and FIG. 6B illustrate an initial route plan and updated route plan after discovery of a new area, in accordance with some embodiments.
Figure 6B:
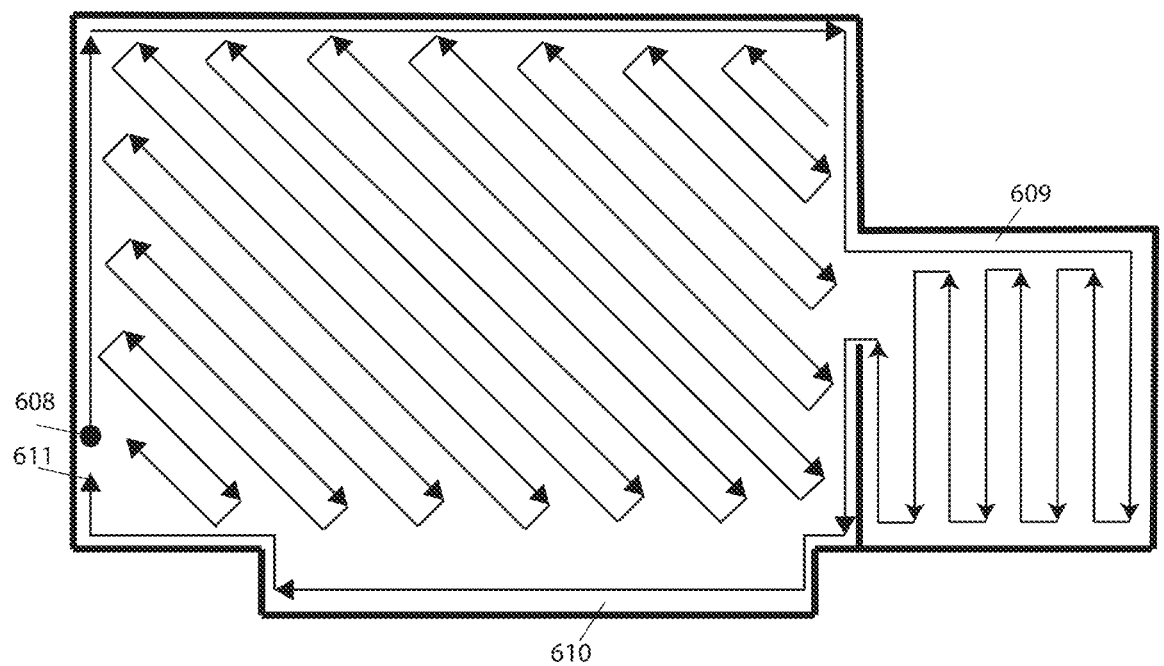

In embodiments, at least one distance sensor, such as a TOF, IR, or touch sensor, disposed along the side of the robotic device may be used to estimate the distance of the robot from an object, such as a wall or obstacle. For example, it may be desirable for the robot to maintain a particular distance from objects, such as furniture or walls, such as instances wherein the robotic device follows along the perimeters or walls of the environment. In other instances, distance sensors may be used to verify the location of objects, such as obstacles and perimeters, in a virtual representation, such as a map, of the environment. Distances to objects measured by the distance sensor are compared to corresponding distances to objects in the virtual representation of the environment. For example, in some embodiments, an initial map of the environment may contain a perimeter in a particular location, which upon verification of the perimeters using a distance sensor may not be found to be in that particular location. In FIG. 6A, for example, initial map 600 comprises perimeter segment 601 extending from dashed line 602 to dashed line 603 and perimeter segment 604 extending from dashed line 605 to 606, among the other segments combined to form the entire perimeter shown. Based on initial map 600 of the environment, route plan 607 covering central areas of the environment may be devised and executed for cleaning. Upon completion of route plan 607, the robotic device may cover the perimeters for cleaning while simultaneously verifying the mapped perimeters using at least one distance sensor of the robotic device, beginning at location 608 in FIG. 6B. As the robot follows along the perimeter, area 609 beyond previously mapped perimeter segment 601 is discovered. This may occur if, for example, a door in the location of perimeter segment 601 was closed during initial mapping of the environment. Newly discovered area 609 may then be covered by the robotic device as is shown in FIG. 6B, after which the robot may return to following along the perimeter. As the robot continues to follow along the perimeter, area 610 beyond previously mapped perimeter segment 604 is discovered. This may occur if, for example, a curtain in the location of perimeter segment 604 is drawn shut during initial mapping of the environment or other obstacles are removed. Newly discovered area 610 may then be covered by the robotic device as is shown in FIG. 6B, after which the robot may return to following along the perimeter until reaching an end point 611. In embodiments, the newly discovered areas may be stored in a second map separate from the initial map.

In embodiments, the outcome of a work session (e.g., a cleaning session between visits to a base station where a robot is charged) is stored in memory (e.g., of the robot, base station, or remote computer) and may be used for analysis (e.g., by a process of the robot, base station, or remote computer). Saved outcomes from past iterations may be used to influence the future real-time route planning whereby analysis of historic data may aid in formulating better route plans. In embodiments, the consecutively executed route plans completed within corresponding consecutively discovered areas in one work session are adjusted over time such that repeat coverage and coverage time are minimized over a period of robotic device's life. U.S. Patent App. No. 62/666,266, the contents of which are hereby incorporated by reference, demonstrates such an approach where coverage by the robotic device becomes more efficient over time through adjustments applied to route plans over time. In some embodiments, the order of covering discovered areas within route plans may also be optimized based on historical data. For example, the order of coverage of discovered areas which yields highest reward based on an MDP algorithm may indicate an optimized order of covering discovered areas. This process of optimization, over time, organically leads to an order which is most efficient. For example, covering all discovered areas within one room, then moving onto discovered areas within a second room is more efficient than covering some discovered areas in one room, covering some discovered areas in a second room, returning back to the first room to cover the remaining areas and then back to the second room to cover remaining areas.

In some embodiments, to improve navigation of the robotic device while executing a path plan, the processor of the robotic device predicts or infers the position of the robotic device. To do so, in some embodiments, a processor of the robotic device minimizes error, e.g., the difference between the true position and predicted position. The position of the robotic device may be predicted given a previous position estimate $x_t$, sensor measurements $u_t$ from, for example, wheel encoders, and time step $\Delta t$:

$$\hat{x}_{t+1} = \text{model}(x_t, u_t, \Delta t)$$

wherein $\hat{x}_{t+1}$ is the new estimated position. At some time points the pose of the robotic device is received from, for example, sensor pose updates, the corrected pose denoted by $x_{t+1}$ at time t+1. Due to wheel slippage, measurement noise, etc., a tracking error $e = x_{t+1} - \hat{x}_{t+1}$ exists.

To reduce the tracking error, and the performance of the position prediction algorithm, parameters may be introduced into the model. For example, in embodiments, a parameterized model $\hat{x}_{t+1} = \text{model}(x_t, p_t)$ may be used, with observations x, and unknown parameters $p_t$ at time t. The parameters $p_t$ which minimize the prediction error $x_{t+1} - \hat{x}_{t+1}$ wherein $x_{t+1}$ is the true observations and $\hat{x}_{t+1}$ may be used as the predicted observations at time t+1. In embodiments, recursive estimation may be used to estimate the parameters and may be formally represented by:

$$p_{t+1} = p_t + K_{t+1}(x_{t+1} - \hat{x}_{t+1})$$

wherein $p_{t+1}$ is the estimated parameter at time t+1. $K_{t+1}$ is the gain and may be used to determine the degree of influence the prediction error $x_{t+1} - \hat{x}_{t+1}$ has on the updated parameter estimate $p_{t+1}$. The parameter may be updated in the direction of the error gradient, i.e., $$K_{t+1} = Q_{t+1} \Psi_{t+1}$$

wherein $$\Psi_{t+1}^T = \frac{\partial \hat{x}_{t+1}}{\partial p_t}$$

is the gradient and $Q_{t+1}$ may be suitably chosen depending on the type of algorithm desired. For example, for tracking error gradient descent $Q_{t+1}$ may be a constant or for tracking error gradient descent with normalized gradient $Q_{t+1}$ may be equal to $$\frac{\gamma}{\|\Psi_{t+1}\|^2 + \text{bias}}$$

or for Kalman filter $K_{t+1}$, $Q_{t+1}$ may be considered Kalman gain.

In embodiments, the model may include parameters $p_t = [p_1, \ldots, p_N]$, whereby the position prediction model becomes a function of parameters $p_t$ as well:

$$\hat{x}_{t+1} = \text{model}(x_t, u_t, \Delta t, p_t)$$

These wheel parameters may be, for example, wheel radii, distance between wheels, wheel position, sensor position, etc. As described above, recursive estimation may be used to estimate these parameters using $p_{t+1} = p_t + K_{t+1}(x_{t+1} - \hat{x}_{t+1})$, where $K_{t+1} = Q_{t+1} \Psi_{t+1}$ and $$\Psi_{t+1}^T = \frac{\partial \hat{x}_{t+1}}{\partial p_t}.$$

In embodiments, tracking error gradient descent approach may be used whereby p is incrementally perturbed in the direction that reduces the error the most, for example in the direction of the descent on the tracking error function $E = \frac{1}{2} e^T e$. This results in the following update rule for p:

$$p_{t+1} = p_t + h \frac{\partial \hat{x}_{t+1}^T}{\partial p_t} e$$

where $Q_{t+1} = h$, a small step size and $e = (x_{t+1} - \hat{x}_{t+1})$. This method has several hyperparameters that the processor of the robotic device may use for fine tuning. For example, an adaptive step size h(t) may be used where for example it may decay with time or Q may be pre-multiplied by some matrix M, such that updates are larger in directions with high certainty and smaller for areas with low certainty or stability improvements such as outlier detection may be used. These hyperparameters are merely an example and are not intended to limit hypermarameters that may be used with this method (which is not to suggest other statements are limiting).

In some embodiment, where an Extended Kalman Filter is used, the state space may be augmented to:

$$\tilde{x}_t = \begin{pmatrix} x_t \\ p_t \end{pmatrix}$$

and the Kalman filter applied to $\tilde{x}$. Assuming parameters are time-invariant, zero noise is modeled on the parameter part of the state and the state space can be represented as below.

$$\tilde{x}_{t+1} = \tilde{\Phi}(\ldots) = \begin{pmatrix} \text{model}(x_t, u_t, \Delta t, p_t) \\ p_t \end{pmatrix}$$

The Jacobian matrix for the augmented state space is then given by:

$$\tilde{F} = \frac{\partial \tilde{\Phi}}{\partial \tilde{x}_t} = \begin{pmatrix} F & \Psi_t^T \\ 0 & I \end{pmatrix}$$

where F is the Jacobian from the non-augmented Kalman process.

For example, a robot's motion may be modeled by the equations below:

$$\dot{x} = v \cos \omega$$

$$\dot{y} = v \sin \omega$$

$$\dot{\theta} = \omega$$

where v and ω are translational and rotational velocities, respectively. As previously described, the navigation strategy of the robot with differential drive is to move in a straight line, rotate in place, then move in a straight line again. For such motion, a forward model may be used to determine the pose of the robotic device with the same equations as previously described:

$$x_{t+1} = x_t + v \Delta t \cos \theta_t$$

$$y_{t+1} = y_t + v \Delta t \sin \theta_t$$

$$\theta_{t+1} = \theta_t + \omega \Delta t$$

where translational and rotational velocities of the robot are computed using observed wheel angular velocities $\omega_l$ and $\omega_r$.

$$\begin{pmatrix} v \\ \omega \end{pmatrix} = J \begin{pmatrix} \omega_l \\ \omega_r \end{pmatrix} = \begin{pmatrix} r_l/2 & r_r/2 \\ -r_l/l & r_r/l \end{pmatrix}$$

$r_l$ and $r_r$ represent left and right wheel radii, respectively and l is the distance between the two wheels, or otherwise the length of the axle connecting the wheels. The equation for v, assuming each wheel is rolling, is given by $$v = \frac{\omega r}{2}$$

and the equation for ω stems from $$\omega\left(R + \frac{l}{2}\right) = v_r \text{ and } \omega\left(R - \frac{l}{2}\right) = v_l,$$

which may be combined to form the equation $$\omega = \frac{v_r - v_l}{2}.$$

Here, wheel sizes are considered parameters $p_t = [r_l, r_r]^T$ and $J = J(p_t)$. For observed left and right wheel rotational velocities $u_t = [\omega_l, \omega_r]^T$, parameters p are estimated to improve the forward model. Here the state vector is abbreviated by:

$$x_t = \begin{pmatrix} x_t \\ y_t \\ \theta_t \end{pmatrix}$$

resulting in the model below.

$$\tilde{x}_{t+1} = \text{model}(x_t, u_t, \Delta t, p_t) = \begin{pmatrix} x_t + v_t \Delta t \cos \theta_t \\ y_t + v_t \Delta t \sin \theta_t \\ \theta_t + \omega_t \Delta t \end{pmatrix}$$

with, $$\begin{pmatrix} v_t \\ \omega_t \end{pmatrix} = J(p_t) u_t$$

Using the model given for $\hat{x}_{t+1}$ and the equations for velocities v and ω, the gradient in direction of the model parameters can be computed as below at a time point t:

$$\frac{\partial \hat{x}_{t+1}}{\partial p_t} = \frac{1}{2} \Delta t \begin{pmatrix} \omega_l \cos \theta_t & \omega_r \cos \theta_t \\ \omega_l \sin \theta_t & \omega_r \sin \theta_t \\ \frac{-2\omega_l}{b} & \frac{2\omega_r}{b} \end{pmatrix}$$

The computed gradient may be used when calculating updated parameters using, for example, the equation previously described for tracking error gradient descent:

$$p_{t+1} = p_t + h \frac{\partial \hat{x}_{t+1}^T}{\partial p_t} e$$

or in the Jacobian matrix for an augmented state space when using an EKF approach described earlier:

$$\tilde{F} = \frac{\partial \Phi}{\partial \tilde{x}_t} = \begin{pmatrix} F & \Psi_t^T \\ 0 & I \end{pmatrix}$$

where $$\Psi_{t+1}^T = \frac{\partial \hat{x}_{t+1}}{\partial p_t}$$

and F is the Jacobian from the non-augmented Kalman process.

Figure 7A:
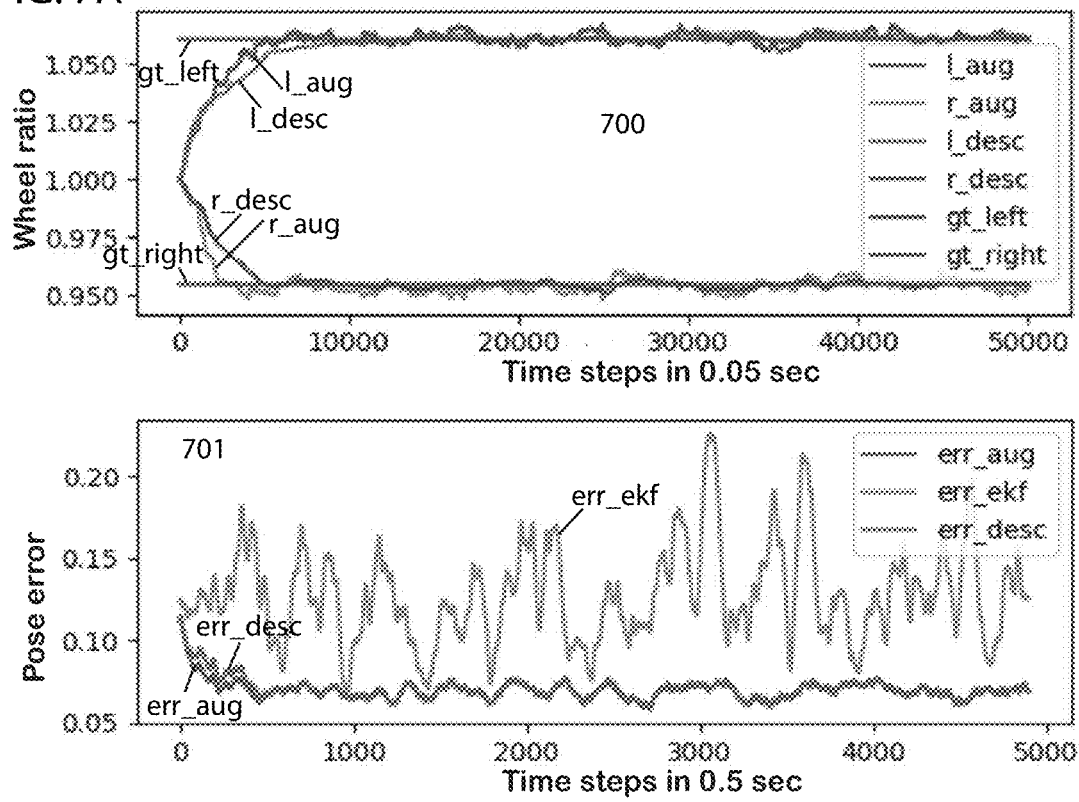
FIGS. 7A-7E illustrate predicted wheel radii parameters and corresponding error in pose for augmented Kalman filter and tracing error gradient descent methods, in accordance with some embodiments.
Figure 7B:
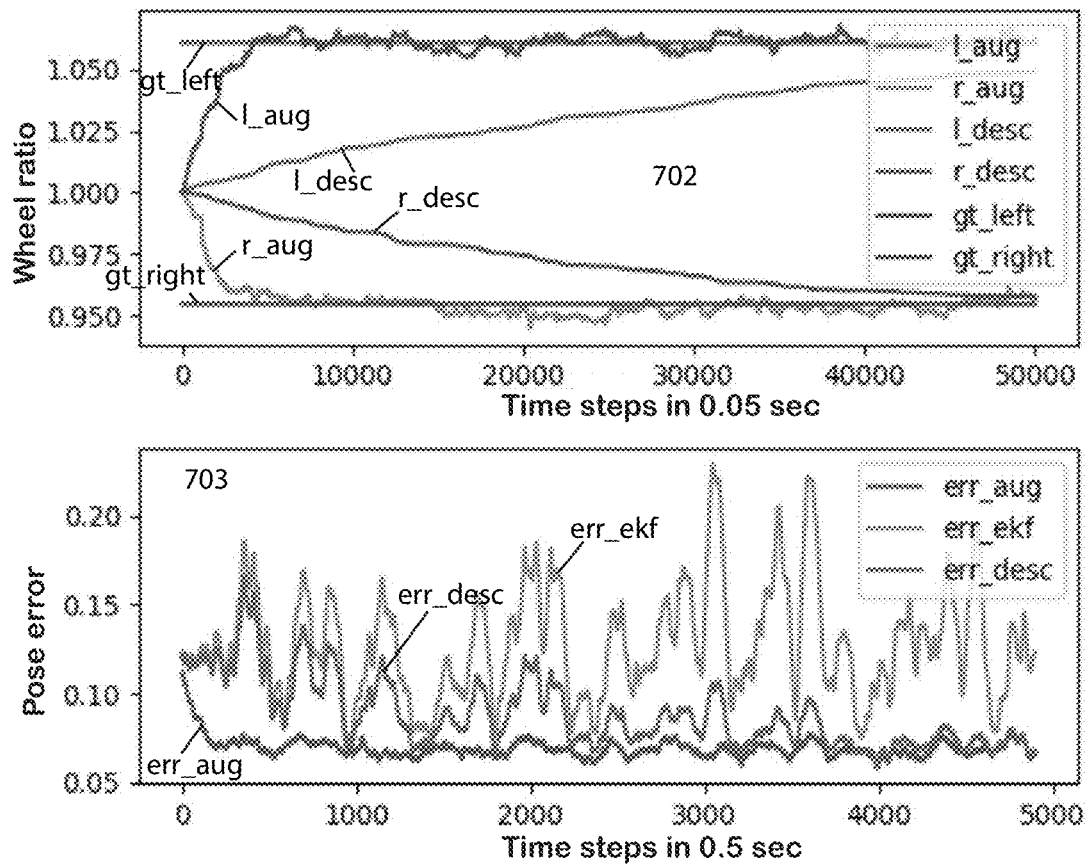
Figure 7C:
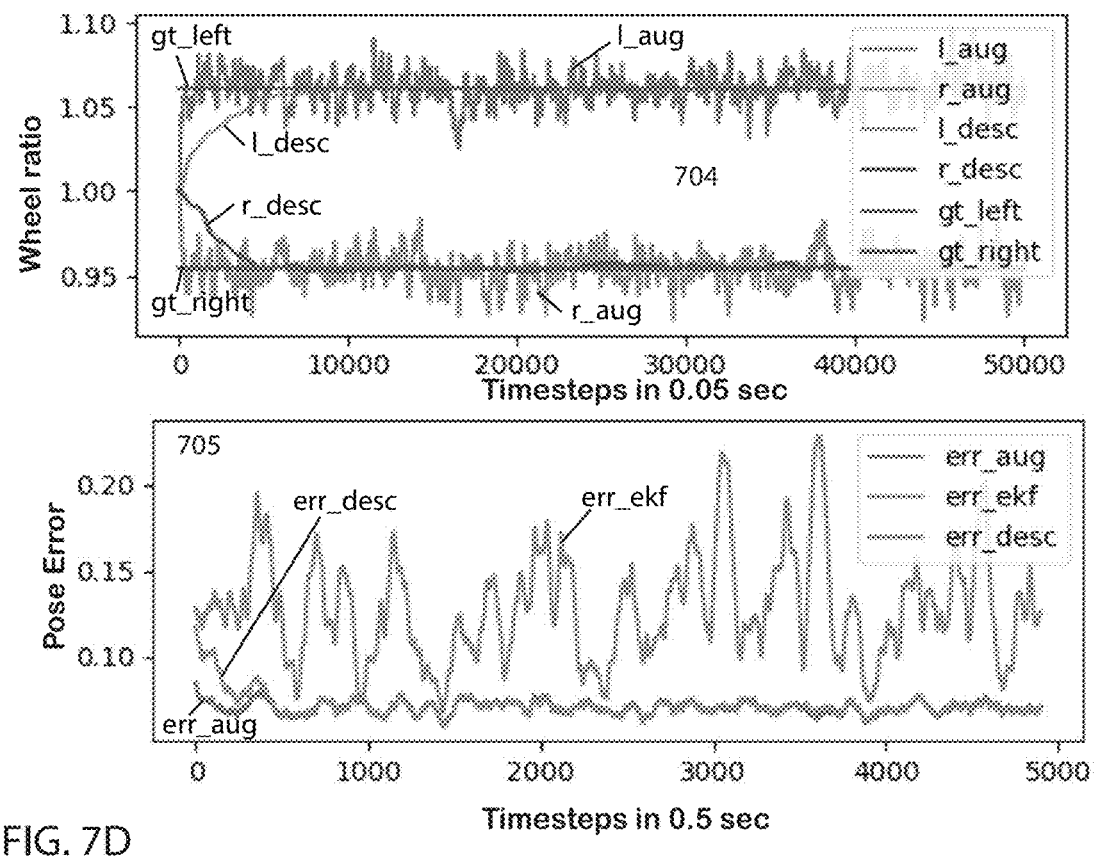
Figure 7D:
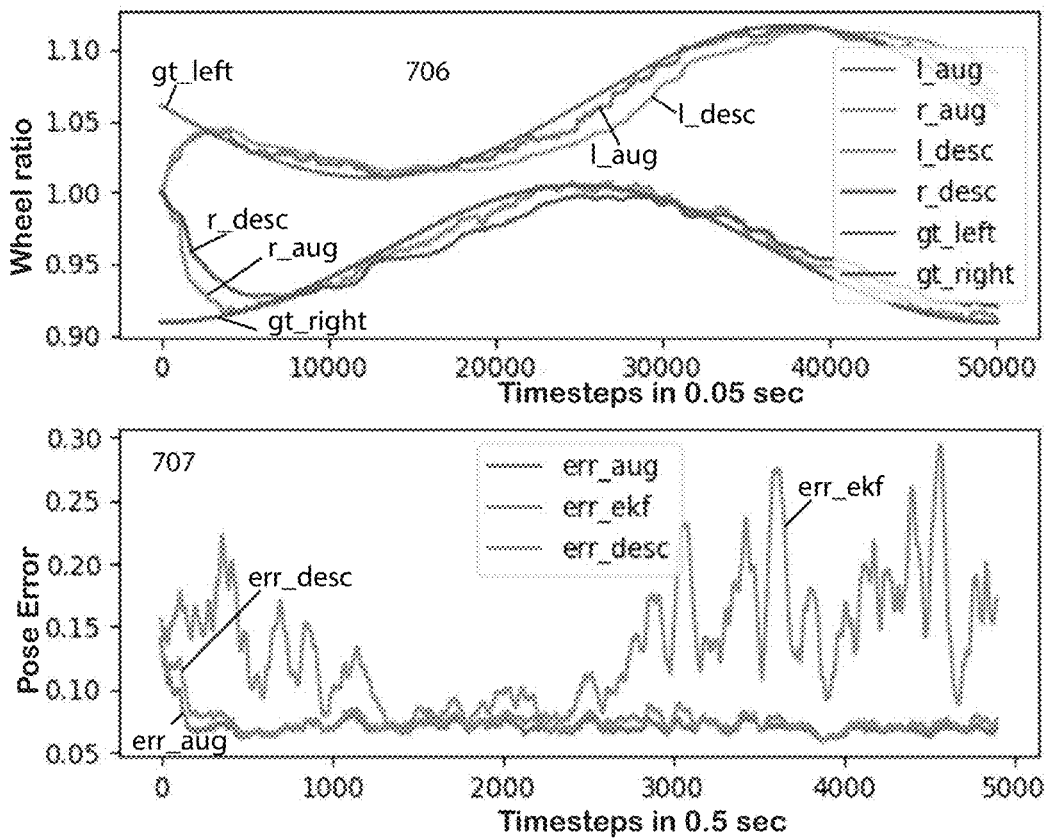
Figure 7E:
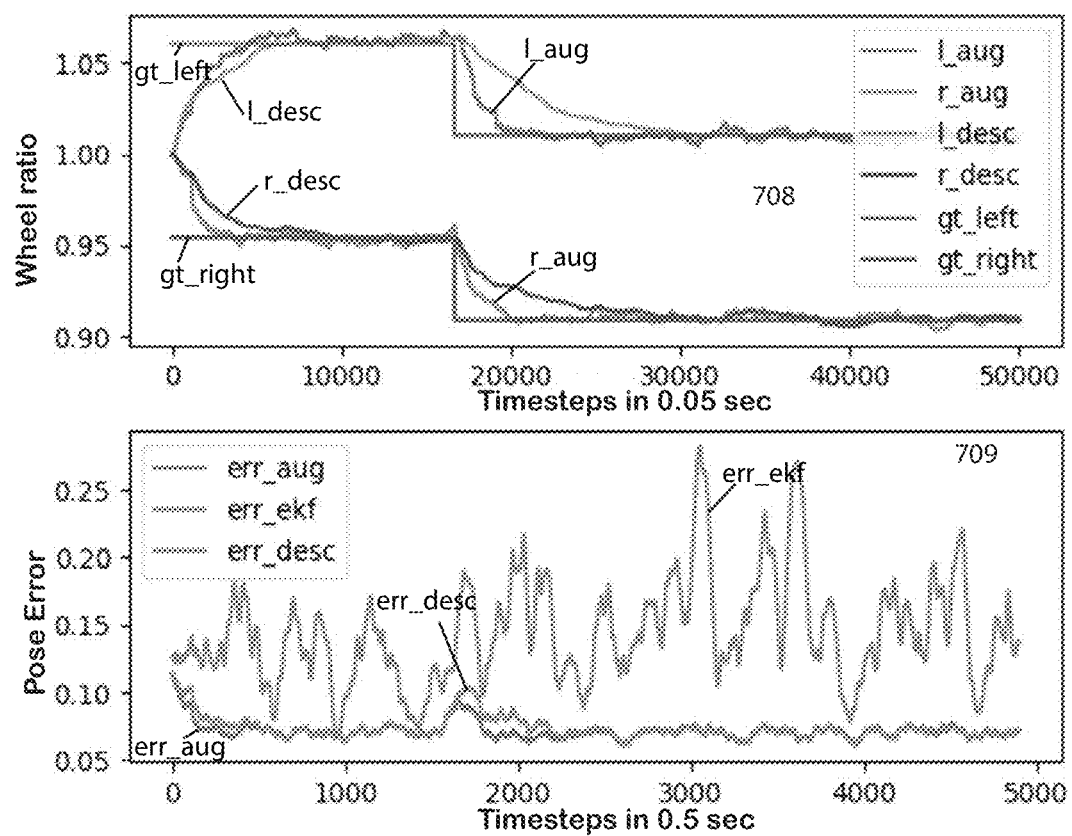

FIGS. 7A-7E illustrate estimated left and right wheel radii model parameters using tracing error gradient decent and augmented Kalman filter methods given simulated data with Gaussian noise. The average error in the pose is also illustrated. In FIG. 7A, augmented Kalman filter (l_aug, r_aug) and tracing error gradient descent (l_desc, r_desc) estimating left and right wheel radii are illustrated in graph 700. This is plotted along the y-axis as a wheel ratio of the predicted wheel radius/expected wheel radius (e.g. as reported by the manufacturer) at time steps of 0.05 seconds along the x-axis. Ground truth (gt_left, gt_right) of actual wheel radius/expected wheel radius for the left and right wheel is illustrated and is what both models attempt to predict. Graph 701 illustrates the error of the predicted pose, calculated as the norm of the difference between the predicted pose and actual pose for augmented Kalman filter, tracing error gradient descent, and for comparison, a vanilla EKF at time steps of 0.5 seconds along the x-axis. This demonstrates that improving model accuracy using augmented Kalman filter or tracing error gradient descent lowers the prediction error significantly. In FIG. 7B, a lower step size in the tracing error gradient descent method is used, in comparison to FIG. 7A, which is evident as ground truth is approached much slower in graph 702 and is reflected in the prediction error in graph 703. In FIG. 7C higher noise for the parameters is used in comparison to FIG. 7A. This has a most noticeable effect on the augmented Kalman filter method, producing much noisier estimates in graph 704. However, this appears to have no effect on the error shown in graph 705. In FIG. 7D time variant wheel sizes are used in comparison to FIG. 7A. Both augmented Kalman filter and tracing error gradient descent methods are capable of tracking changes in parameters over time as is shown in graph 706 and error in pose over time is almost unchanged in graph 707. In FIG. 7E, a drop in the parameters is implemented (e.g. due to deformation) in comparison to FIG. 7A. It can be seen that both methods quickly adapt in graph 708 and that the error in the pose in graph 709 only jumps slightly for a short period of time after encountering the drop in parameters.

Figure 8A:
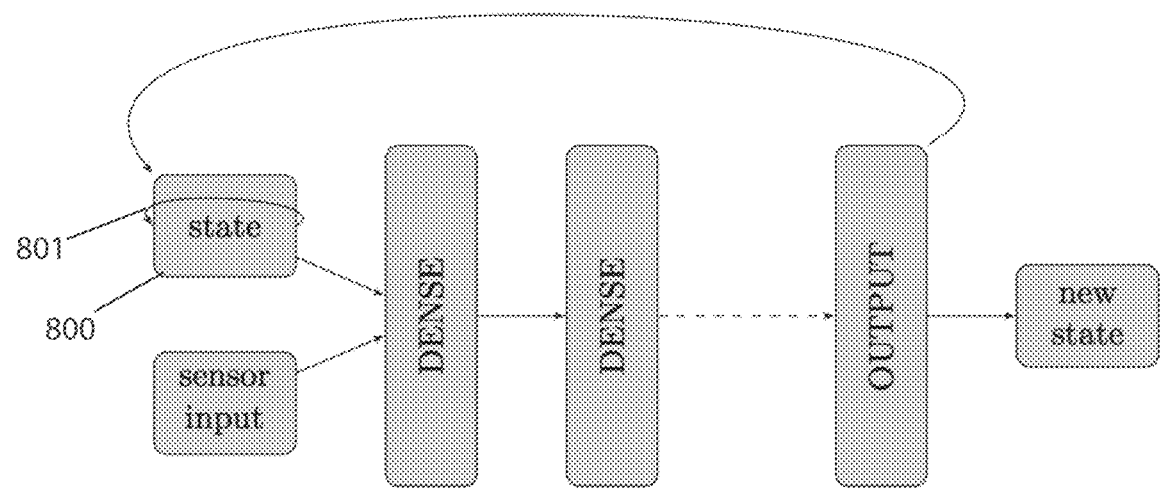
FIGS. 8A-8C illustrates examples of position prediction methods with implemented RNNs, embodying features of the present invention.
Figure 8B:
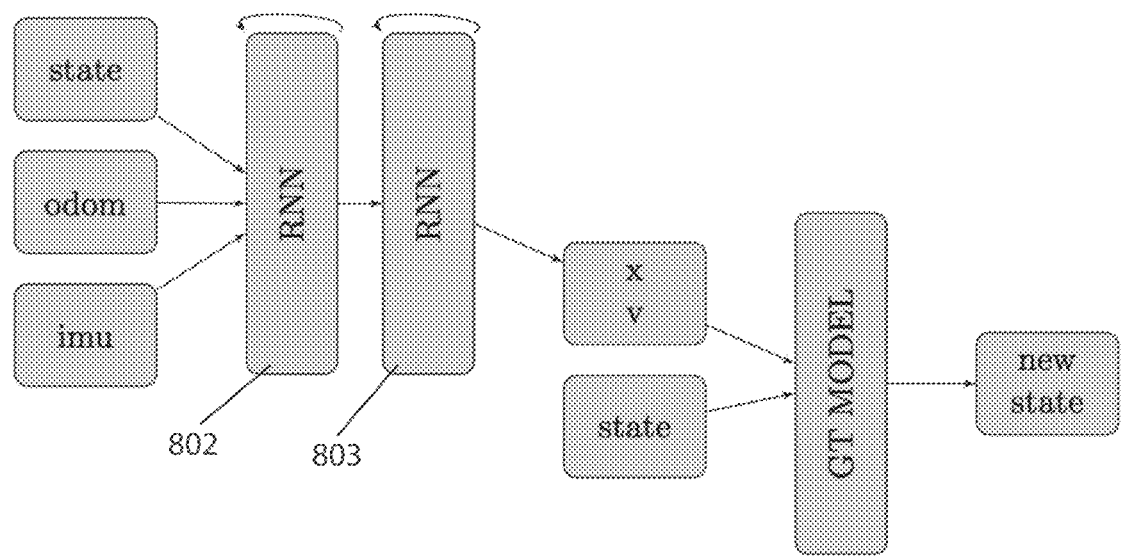
Figure 8C:
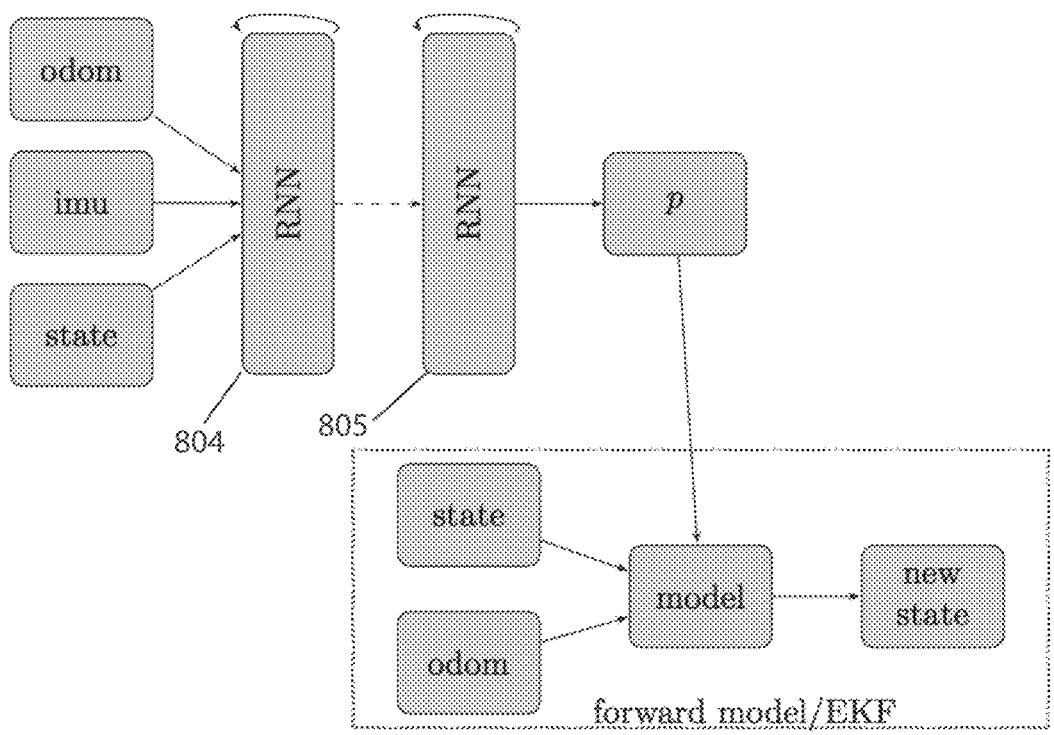

A feedforward neural network may be used to learn a motion model for the robot given sufficient training data. For example, a model may consider the old position and measured velocity to estimate the new position of the robot. This model would be capable of mapping coordinate dependent parameters, such as a tilted floor. As a further example, a model may only consider the measured velocity of the robot having an initial starting position of (0, 0, 0). While such models may be trained to a high degree of accuracy for predicting the position of the robot, they do not take previous measurements into account and online calibration would require frequent backpropagation of errors, potentially resulting in substantial computational costs. Therefore, in embodiments, a recurrent neural network (RNN) may be used for predicting the position of the robot using a trained model. In contrast to classical feedforward neural networks, RNNs consider both the current input and what was perceived in previous steps, an approach which is observed in the position prediction methods described earlier. Internally, recurrent units have a hidden internal state which influences the output. This hidden state is updated with each input, providing a feedback loop at every time step in the input series. Different hierarchies may be used, for example, wherein output from one time step is fed back as input at the next time step. FIGS. 8A-8C illustrate example schematics for position prediction with implemented recurrent units. In FIG. 8A, recurrent unit 800 is the state box. Since recurrent units have memory, arrow 801 represents the ability of the recurrent unit to remember its state. Recurrent unit 800 allows previous states to be considered when predicting the new state of the robotic device. The remaining schematic is a classic neural network. In FIG. 8B, recurrent units 802 and 803 are used as a pre-filter for odometer and inertial measurement unit (imu) data. The output of the pre-filter is used in a ground truth (GT) model to predict the new state of the robotic device. In FIG. 8C, recurrent units 804 and 805 are used to learn mapping observations to parameters p of a forward/EKF model used to predict the new state of the robotic device. Recurrent units in FIGS. 8B and 8C have arrows similar to arrow 801 of recurrent unit 800 in FIG. 8A as recurrent units consider what was perceived (or observed or measured) in previous steps.

Figure 9:
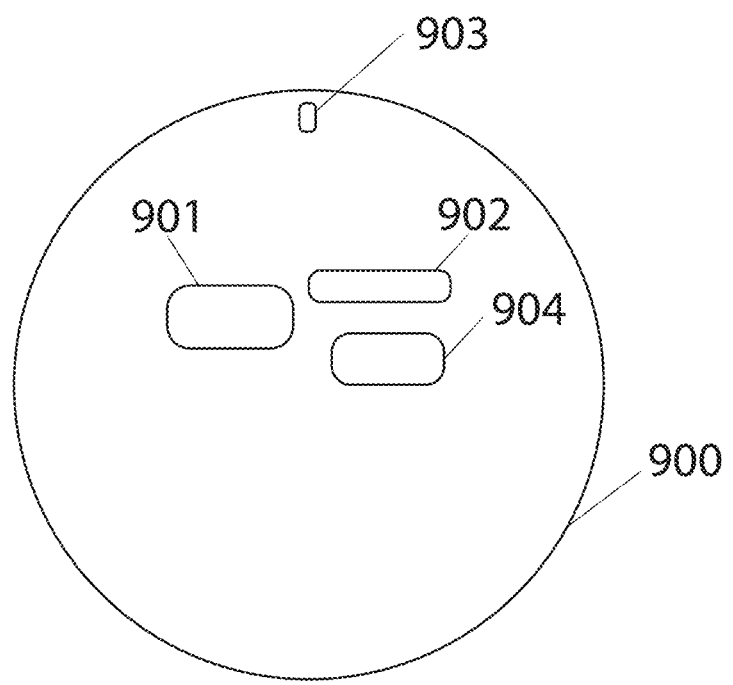
FIG. 9 is a schematic diagram of an example of a robot with which the present techniques may be implemented.

FIG. 9 depicts an example of a robotic device 900 with processor 901, memory 902, sensor 903 and actuator 904. In some embodiments, the robot may include the features of a robot described herein. In some embodiments, program code stored in the memory 902 and executed by the processor 901 may effectuate the operations described herein.

Figure 10:
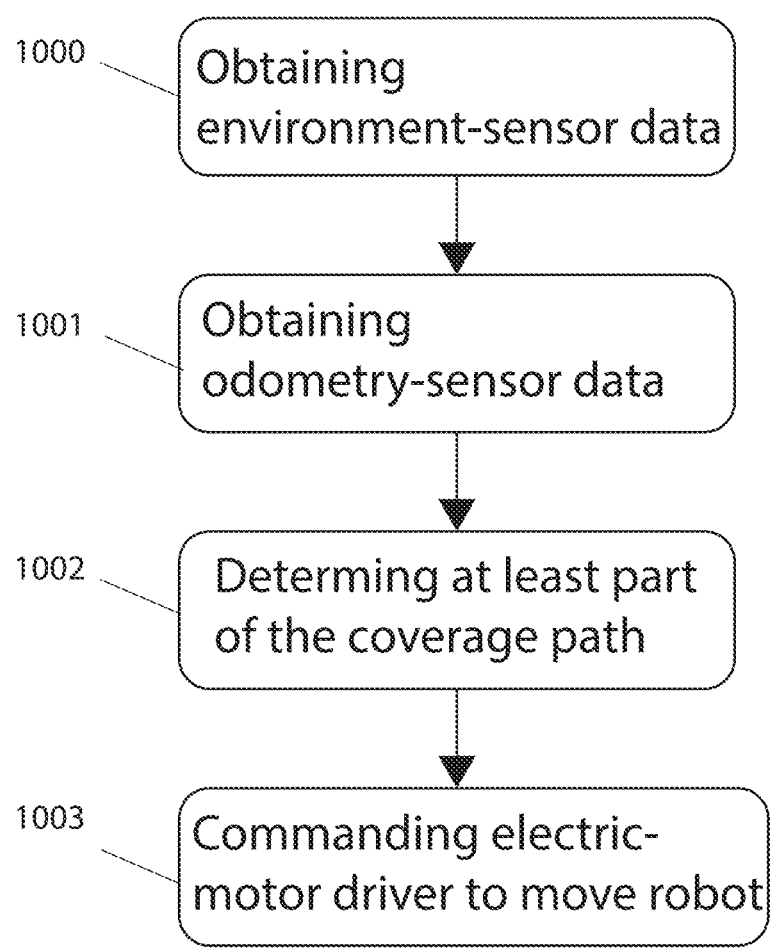
FIG. 10 is a flowchart describing embodiments of a path planning method, embodying features of the present invention.

FIG. 10 illustrates a flowchart describing embodiments of a path planning method of a robotic device 1000, 1001, 1002, and 1003 corresponding with steps performed in some embodiments.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

I claim:

1. A tangible, non-transitory, machine-readable medium storing instructions that when executed by one or more processors effectuate operations comprising:
    obtaining a map of a physical layout of a working environment of a robot, the map including boundaries and obstacle perimeters detected using a plurality of sensors of the robot;
    maneuvering, during a cleaning or cleaning and mapping session, the robot to a first location and orientation of the working environment that positions the robot to sense a part of the physical layout of the working environment at a second location of the working environment;

sensing, with at least some of the plurality of sensors, while the robot is at the first location, the part of the physical layout of the working environment at the second location;

updating, during the session, based on the sensing, the map of the physical layout of the working environment;

determining, during the session, based on the updated map, with one or more processors of the robot, at least a part of a route plan of the robot through the working environment, wherein:
- the working environment is represented by a plurality of regions in a region graph;
- an instance of a coverage pattern is determined for a first region among the plurality of regions based on a plurality of dimensions of the first region; and
- determining the coverage pattern comprises determining a first region-specific orientation based on the plurality of dimensions of the first region; and maneuvering the robot along the at least a the part of the route plan, wherein:
- the at least the part of the route plan is devised within a bounded area within an area smaller than a total area discovered by the robot; and
- the at least the part of the route plan is adjusted in real-time in response to detecting the at least the part of the route plan is adjacent to an obstacle.

2. The medium of claim 1, wherein:
the at least the part of the route plan includes an edge linked by vertices at which the at least the part of the route plan is re-evaluated by the one or more processors of the robot based on further sensed physical layout of the working environment.

3. The medium of claim 1, wherein:
determining the at least the part of the route plan comprises determining a net cumulative reward of a candidate route plan h based on:
a minimum operation time;
a minimum number of turns along the candidate route plan; and
a minimum length of the candidate route plan.

4. The medium of claim 1, wherein:
the working environment is segmented into the plurality of regions; and
a preliminary route plan is determined before beginning the session.

5. The medium of claim 4, wherein:
the preliminary route plan is selected to probe an unknown location of the working environment.

6. The medium of claim 1, wherein:
determining the at least the part of the route plan comprises optimizing an objective function; and
the objective function is based on at least two of the following: turns, repeated coverage, transitions between different types of flooring, operation time, total distance, or switching rooms.

7. The medium of claim 1, wherein:
the plurality of sensors comprise: a bump sensor, a camera, an ultrasonic transceiver, and an infrared sensor.

8. The medium of claim 1, the operations comprising causing the robot to detect at least some of the plurality of obstacles by physically contacting the obstacles.

9. The medium of claim 1, the operations comprising:
determining a route of the robot in a subsequent session based on the updated map of the physical layout of the working environment.

10. The medium of claim 1, wherein at least some of the operations are executed by a datacenter.

11. The medium of claim 1, wherein the at least the part of the route plan is determined with a polymorphic navigation algorithm configured to select an orientation of a boustrophedon pattern aligned parallel to a longest dimension of the first region.

12. The medium of claim 1, wherein the map is a three-spatial-dimensional map.

13. The medium of claim 1, wherein the map represents different areas of the working environment with state indicating:
an obstacle area of the physical layout of the working environment;
a free space area of the physical layout of the working environment; and
an unknown area of the physical layout of the working environment.

14. A medium of claim 1, the operations comprising:
cleaning a first portion of a room of the working environment with the robot while traversing the at least a the part of a the route plan, wherein:
the at least part of the instance of the coverage pattern for the first region is determined in real-time by the robot based on an objective function that assigns values to at least two of the following: turns, repeated coverage, transitions between different types of flooring, or switching rooms; and
cleaning a second portion of the room by traversing a perimeter of the room with the robot.

15. The method of claim 14, wherein:
the first portion is cleaned before the second portion; and
the first pattern comprises a zig-zag pattern, a boustrophedon pattern, a spiral pattern, a Gosper curve, a Morton curve, a Hilbert curve, or Archimedean chords.

16. The medium of claim 1, wherein:
the second location is designated in the map of the physical layout of the working environment as having an unknown state, the map designating at least some other areas as having a known state.

17. The medium of claim 1, wherein the operations comprise:
steps for analyzing the outcome of a work session.

18. The medium of claim 1, wherein the operations comprise:
steps for reducing tracking error.

19. A device, comprising:
a robot comprising:
a battery;
an electric-motor controller;
two or more electric motors coupled to the battery and controlled by the electric-motor controller;
one or more processors configured to control the electric-motor controller; and
a tangible, non-transitory, machine readable media storing instructions that when executed by at least some of the processors effectuate operations comprising:
obtaining a map of a physical layout of a working environment of the robot, the map including boundaries and obstacle perimeters detected using a plurality of sensors of the robot;
maneuvering, during a cleaning or cleaning and mapping session, the robot to a first location and orientation of the working environment that positions the robot to sense a part of the physical layout of the working environment at a second location of the working environment;

sensing, with at least some of the plurality of sensors, while the robot is at the first location, the part of the physical layout of the working environment at the second location;

updating, during the session, based on the sensing, the map of the physical layout of the working environment;

determining, during the session, based on the updated map, with one or more processors of the robot, at least a part of a route plan of the robot through the working environment, wherein:

the working environment is represented by a plurality of regions in a region graph;

an instance of a coverage pattern is determined for a first region among the plurality of regions based on a plurality of dimensions of the first region; and determining the coverage pattern comprises determining a first region-specific orientation based on the plurality of dimensions of the first region; and maneuvering the robot along the at least the part of the route plan, wherein:

the at least the part of the route plan is devised within a bounded area within an area smaller than a total area discovered by the robot; and the at least the part of the route plan is adjusted in real-time in response to detecting the at least the part of the route plan is adjacent to an obstacle.

20. The device of claim 19, wherein:

the at least the part of the route plan includes an edge linked by vertices at which the at least the part of the route plan is re-evaluated by the one or more processors of the robot based on further sensed physical layout of the working environment.

* * * * *